United States Patent [19]
Holman, Jr.

[11] Patent Number: 5,276,832
[45] Date of Patent: Jan. 4, 1994

[54] COMPUTER SYSTEM HAVING A SELECTABLE CACHE SUBSYSTEM

[75] Inventor: Thomas H. Holman, Jr., Austin, Tex.

[73] Assignee: Dell U.S.A., L.P., Austin, Tex.

[21] Appl. No.: 541,103

[22] Filed: Jun. 19, 1990

[51] Int. Cl.$^5$ .................................. G06F 13/00
[52] U.S. Cl. .................. 395/425; 364/DIG. 1; 364/245; 364/245.31; 364/255.1; 364/254.9
[58] Field of Search ..364/200, 200/MS; 395/425, 400; 361/397, 400; 365/63

[56] References Cited

U.S. PATENT DOCUMENTS

| | | | |
|---|---|---|---|
| 3,917,984 | 11/1975 | Kong et al. | 317/101 |
| 4,190,901 | 2/1980 | Johnson et al. | 365/72 |
| 4,195,342 | 3/1980 | Joyce et al. | 364/200 |
| 4,255,852 | 3/1981 | Johnson et al. | 29/837 |
| 4,430,712 | 2/1984 | Coulson et al. | 364/300 |
| 4,545,010 | 10/1985 | Salas et al. | 364/200 |
| 4,566,082 | 1/1986 | Anderson | 365/230 |
| 4,628,409 | 12/1986 | Thompson et al. | 361/403 |
| 4,646,233 | 2/1987 | Weatherford et al. | 364/200 |
| 4,675,808 | 6/1987 | Grinn et al. | 364/200 |
| 4,719,568 | 1/1988 | Carrubba et al. | 364/200 |
| 4,737,909 | 4/1988 | Harada | 364/200 |
| 4,833,642 | 5/1989 | Ooi | 395/425 |
| 4,859,190 | 8/1989 | Anderson | 439/78 |
| 4,908,789 | 3/1990 | Blokkum et al. | 364/900 |
| 5,012,408 | 4/1991 | Conroy | 364/200 |
| 5,091,850 | 2/1992 | Culley | 395/400 |
| 5,133,060 | 7/1992 | Weber et al. | 395/425 |

*Primary Examiner*—Rebecca L. Rudolph
*Attorney, Agent, or Firm*—Thomas G. Devine; James W. Huffman

[57] ABSTRACT

A cache subsystem for a computer system which includes a cache memory and a cache control means. When the processor subsystem of the computer system requests data, information related to the location of the data within the memory subsystem of the computer is input to the cache subsystem. The control means receives an address bus bit field and transmits control signals which vary depending on the received address bus bit field to the cache memory to look for the requested data. The address bus bit field is configured based upon the dimensions of the cache memory and includes information as to where the data would be stored within the cache memory. As different cache memories are of different dimensions, means for modifying the address bus bit field generated by the cache control means based on the dimensions of the cache memory are provided so that the cache subsystem may be readily configured to operate with different sized cache memories.

27 Claims, 13 Drawing Sheets

COMPUTER SYSTEM HAVING A SELECTABLE CACHE SUBSYSTEM

CROSS REFERENCE TO RELATED APPLICATIONS

This application is related to the following U.S. Patent Applications:

| SER. NO. | TITLE | INVENTOR | FILING DATE |
|---|---|---|---|
| 490,003 | Method and Apparatus for Performing Multi-Master Bus Pipelining | Zeller, et al. | 03/07/90 |
| 540,983 | Error Correction Code Pipeline For Interleaved Memory | Matteson, et al. | 06/19/90 |
| 529,985 | Processor and Cache Controller Interface Lock Jumper | Holman, et al. | 05/25/90 |
| 540,651 | Address Enabling System and Method for Memory | Holman, et al. | 06/19/90 |
| U.S. Pat. No. 5,070,450 | Multiple DRAM Assemblies Using a Single PCB | Holman | Issued 12/03/91 |
| U.S. Pat. No. 5,070,450 | Power-On Coordination System and Method for Multi-Processor | Holman, et al. | 05/25/90 |
| 540,049 | System for Sequentially Refreshing an Expandable Dynamic RAM Memory Circuit | Matteson, et al. | 06/19/90 |
| 530,137 | Dual Path Memory Retrieval System for an Interleaved Dynamic RAM Memory Unit | Gaskins, et al. | 05/25/90 |
| 516,628 | Digital Computer Having An Error Correction Code (ECC) System With Comparator Integrated Into Re-encoder | Longwell, et al. | 04/30/90 |
| 516,894 | Minimized 32-Bit Error Correction Bad Bit Decoder | Longwell, et al. | 04/30/90 |
| 516,606 | Shared Logic for Error Correction System Encoding | Longwell, et al. | 04/30/90 |

The above listed applications are all assigned to the assignee of this invention and are incorporated herein by reference.

BACKGROUND OF THE INVENTION

1. Field of the Invention

The invention relates to a cache subsystem for a computer system and, more particularly, to a cache subsystem configured for operation with a selected one of at least two different sized cache memories.

2. Description of Related Art

As is well known to those skilled in the art, a computer system consists of a number of subsystems interconnected by communication paths or busses that transfer data between the subsystems. A typical computer system includes a central processing unit (or "CPU") which comprises the processor subsystem and a plurality of memory and storage devices (or "memory"). The processor subsystem controls the operation of the computer system by executing a sequence of instructions to perform a series of mathematical operations on data. Both the instructions and the data are stored in the computer's memory as binary information in patterns of logical ones and zeros. To transfer data between the processor subsystem and the memory, typical computer systems are provided with a data bus for carrying data to and from the memory, an address bus for carrying signals used to locate specific memory and subsystem addresses and a control bus for carrying timing and control pulses to all subsystems included in a computer system.

The memory of a computer system may be comprised of a plurality of memory subsystems. The predominant memory subsystem is generally referred to as the main memory and is typically composed of dynamic random access memory (or "DRAM") chips. Data and program instructions brought from disk or tape are stored in main memory for use by the processor subsystem. Many computer systems also include a second memory subsystem generally referred to as the cache memory subsystem. Instead of DRAM chips, cache memory subsystems are made up of static random access memory (or "SRAM") chips, thereby resulting in a memory up to two times faster than the main memory. Most cache memory subsystems are used to store operating instructions as well as data likely to be needed next by the processor subsystem, thereby speeding up the operation of the computer system. Cache memory is up to two times faster than main memory and is designed to hold the operating instructions and data likely to be required most frequently by the CPU, thereby reducing the memory access time of the processor subsystem. Finally, a small amount of memory within the CPU is called CPU memory or registers. Made of SRAM circuits which are optimized for speed, data registers within the processors are the fastest memory of all. A program register stores the location in memory of the next program instruction while an instruction register holds the instruction being executed and a general purpose register briefly stores data during processing.

Based upon the foregoing, it should be appreciated that it is known to those skilled in the art to include a cache memory configuration in a computer system to provide a place for fast local storage of frequently accessed data.

A printed circuit board is a device for supporting electronic components mounted on its surface and for electrically interconnecting them with one another. Advances in integrated circuit technology have made possible the construction of computer subsystems such as a cache memory subsystem on one such printed circuit board. In its most elementary form, a printed circuit board consists of a nonconductive substrate clad with a thin layer of metal from which portions are etched away to form a pattern of electrical conductors. Glass-/epoxy fiberglass is a commonly used substrate material and copper is commonly used for the thin layer of metal covering one or both surfaces of the substrate.

The simplest printed circuit boards have only one layer of wiring, often placed on the side of the substrate opposite the mounted components. More complex printed circuit boards also have conductive wiring patterns disposed on both the upper and lower surfaces of the insulative substrate, which allows the interconnection of many more components on a single board. Multilayer printed circuit boards are used in extremely complex circuits and include a plurality of layers of conductive wiring patterns sandwiched between thin insulative substrate layers and interconnected with one another by means of conductive holes extending through one or more of the substrates.

Constructing printed circuit boards, especially those having a plurality of layers of conductors and insulative substrates, is fairly time consuming and involved. The first step in preparing a printed circuit board is to create a photographic transparency of the circuit layout, in which the pattern of the conductors is opaque to light. Next, the transparency is projected onto the board after the layer of conductive material covering the surface of the insulative substrate has been coated with a film of photoresist material that hardens upon exposure to light. Washing away the soft parts of the film in a chemical bath leaves a photoresist pattern on the substrate which is the inverse of the circuit transparency. The conductive pattern which is not protected by the photoresist is coated with solder to protect it and then the copper or other metal that is not covered by the solder plating is etched away. Circuitry on different layers of a multilayer printed circuit board are joined by holes drilled transversely through the different layers which are plated with copper to electrically interconnect the circuits.

Based upon the foregoing, it should be appreciated that printed circuit boards, with their elaborate interconnections, are difficult and costly to build. When manufacturing a cache memory subsystem for a computer system, the system designer would determine the cache memory size required for the particular computer system, design a cache memory subsystem for incorporation into the aforementioned computer system, test the cache memory subsystem for conformance with design specifications and then begin the production of printed circuit boards with the cache memory subsystem manufactured thereon. The cache memory subsystem would then have to be serviced throughout the life of the computer system. As will be more fully described below, the size of the cache memory subsystem controls the amount of information which is quickly accessible to the user. Thus, depending on the particular operating characteristics desired for the computer system, different sized cache memory subsystems are required for different computer systems.

The requirement of different sized cache memory subsystems for different computer systems has been a particularly expensive problem for computer system manufacturers, particularly those manufacturing multiple computer system designs. Unless, the different systems require the same sized cache memory subsystem, the manufacturer must often design, test, manufacture and service any number of multiple cache memory boards. The cache memory subsystem also poses problems for the user as well. In order to upgrade a computer system to one with a larger cache memory, and thereby obtain faster data processing, a user would have to, at worst, replace the entire system and, at best, replace the entire cache memory board. Either alternative is an expensive proposition.

Providing multiple possible electronic circuit configurations on a single printed circuit board, thereby saving the expense of multiple different printed circuit boards for each circuit, has long been sought after as a manufacturing technique. U.S. Pat. No. 4,859,190 to Anderson is directed to a printed circuit board having a pattern of multiple groupings of connector holes which provide for the interconnection of two different types of connectors into the same area of the printed circuit board. The Anderson patent contemplates the use of multiple groupings so that the main printed circuit board may alternately be connected via a first connector to a first subsidiary printed circuit board or via a second connector different from the first connector, to a second subsidiary printed circuit board. Anderson does not address printed circuit boards designed for multiple configurations.

U.S. Pat. No. 4,190,901 to Johnson et al is directed to a printed circuit board which includes a first set of holes for mounting groups of integrated circuit chips required to construct a first memory subsystem and a second set of holes for mounting groups of integrated circuit chips required to construct an alternative memory subsystem. During construction, the printed circuit board is populated with only those integrated circuit chips required for the construction of a memory subsystem with one or more selected features. The Johnson et al patent concentrates on the production of alternate memory subsystems and is not particularly directed toward the construction of a single memory subsystem which, with minor modification, can be reconfigured to serve other needs. U.S. Pat. No. 4,255,852, also to Johnson et al, is related to this same general area.

SUMMARY OF THE INVENTION

In one aspect, the present invention is a cache subsystem for a computer system which includes a processor subsystem and a memory subsystem. The cache subsystem includes a cache memory of a specified dimension and a cache control means which receives an address bus bit field from the processor subsystem and generates control signals to the cache memory which vary depending on the received address bus bit field. When the processor subsystem requests data, the cache control means looks for the requested data within the cache memory using the address bus bit field. Since different cache memories are of different dimensions, means for modifying the address bus bit field generated by the cache control means based on the dimensions of the cache memory are provided so that the cache subsystem may be readily configured to operate with different sized cache memories.

In another aspect, the present invention comprises a cache subsystem having a selectable cache memory. The selectable cache memory includes a first cache memory and a second cache memory, either of which may be installed on a printed circuit board upon which the cache subsystem is installed. A cache controller, also installed on the printed circuit board, is provided to receive a series of signals corresponding to an address within the installed cache memory and generate control signals to the installed cache memory. The specific control signals generated by the cache controller vary, depending on the address signals received. To enable the cache controller to service the installed cache memory, means for modifying the address signals based upon the characteristics of the cache memory installed is also provided.

In yet another aspect, the invention comprises a cache subsystem having a selectable 32 Kbyte or 128 Kbyte cache memory. A 32 Kbyte cache memory or a 128 Kbyte cache memory are alternately installed on a printed circuit board. Also installed on the printed circuit board is a cache controller configured for receiving a 31 bit address signal corresponding to an address within the installed cache memory and generating control signals to the installed cache memory based upon the received address signal. When the 32 Kbyte cache is installed, a signal generating means generates an eighteen bit tag, a nine bit set address, and a one bit line select address signal to the cache controller. When the 128 Kbyte cache is installed, the signal generating means generates an eighteen bit tag, a nine bit set address, and a three bit line select address to the cache controller.

It is an object of this invention to provide a cache subsystem which is operable with multiple sizes of cache memory.

It is another object of this invention to provide a single printed circuit board with a cache subsystem operable with multiple sizes of cache memory installed thereon.

It is yet another object of this invention to provide a cache subsystem for which the cache memory may be expanded without replacing the entire cache subsystem.

BRIEF DESCRIPTION OF THE DRAWINGS

The present invention may be better understood, and its numerous objects, features and advantages will become apparent to those skilled in the art by referencing the accompanying drawings in which.

DETAILED DESCRIPTION OF THE INVENTION

Figure 1:
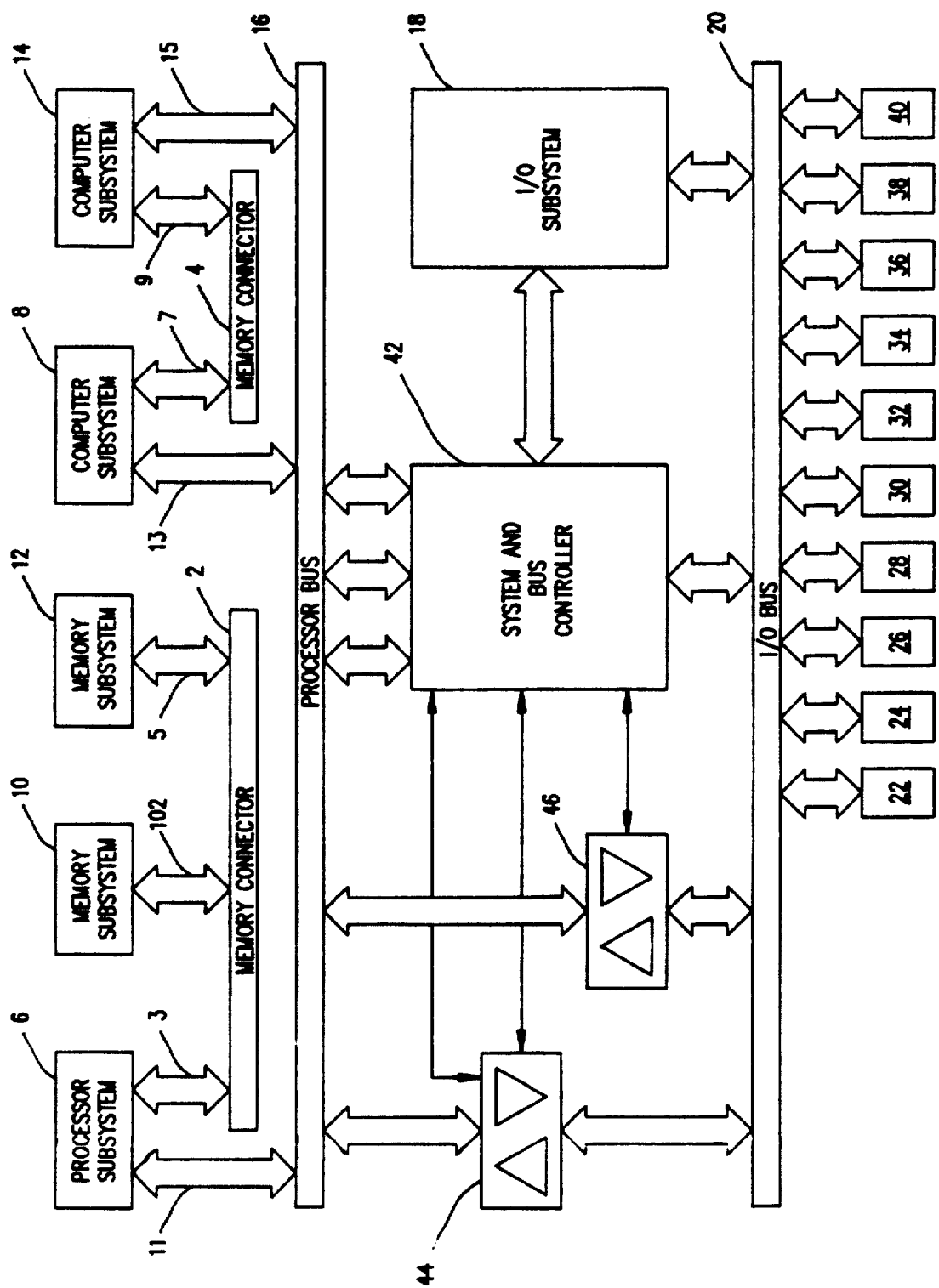
FIG. 1 is a top level block diagram of a computer system.

Referring now to the drawings wherein like reference numerals designate identical or similar elements throughout the several views, depicted in FIG. 1 is a general high level block diagram of a computer system. The present invention will herein initially be considered at this level, and at a number of successive, more detailed levels, to ensure full understanding and appreciation of the role and operation of the present invention in an environment in which it could be usefully employed.

FIG. 1 illustrates a personal computer system employing the system of the present invention. Seen here are four main buses which represent the major interfaces at the top level. These main buses are a first memory connector 2, a second memory connector 4, a processor bus 16 and an I/O bus 20. The first memory connector 2 is a private interface between a processor subsystem 6, a first memory subsystem 10 dedicated to the processor subsystem 6 and a second memory subsystem 12, also dedicated to the processor subsystem 6. Preferably, the first and second memory subsystems 10 and 12 are each configured as a virtual 64 bit interleaved memory with two associated banks for storage of one 32 bit double word each, one odd and one even. The processor subsystem 6, the first memory subsystem 10 and the second memory subsystem 12 are connected to the memory connector 2 by memory interfaces 3, 102, and 5, respectively. The processor subsystem 6 is also connected to the processor bus 16 by a processor interface 11.

The second memory connector 4 is also a private interface, here between a first computer subsystem 8 and a second computer subsystem 14. It is envisioned that various types of subsystems may be installed as the computer subsystems 8, 14, depending on the particular operating capabilities desired for the overall computer system. For example, the computer subsystem 8 may be a second processor subsystem or a second I/O subsystem, although for purposes of the discussion to follow, a second processor subsystem 8 shall be selected as the computer subsystem 8. By similar example, the computer subsystem 14 may be a second or third processor subsystem, a second or third I/O subsystem or a third memory subsystem, although for purposes of the discussion to follow, an intelligent I/O subsystem 14 shall be selected as the computer subsystem 14. Each computer subsystem 8, 14 is provided with a memory interface 7, 9, respectively, to connect to the memory connector 4 and a processor interface 13, 15, respectively, to connect with the processor bus 16.

The processor bus 16 is a multiple master bus which is the architectural break between the processing subsystems (which includes the first processor subsystem 6 and the second processor subsystem 8) and the I/O subsystems (which include a first I/O subsystem 18, the intelligent I/O subsystem 14, and, via an I/O bus 20, I/O expansion slots 22, 24, 26, 28, 30, 32, 34, 36, 38, 40. The processor bus 16 performs various functions. First, the processor bus 16 serves as a connection between the first processor subsystems 6 and 8 and other subsystems which include: all system memory including the first memory subsystem 10 and the second memory subsystem 12; and the I/O subsystems, which includes the first I/O subsystem 18, the intelligent I/O subsystem 14, and the I/O expansion slots 22, 24, 26, 28, 30, 32, 34, 36, 38, 40, all configured for installment of an I/O device therein.

As described above, the processor bus 16 allows each processor subsystem 6, 8 to access another processor subsystem's 8, 6 memory subsystem. This access is allowed "through" the processor that is directly connected to the memory. That is, when a processor connected to the processor bus 16 requests access to a location in some other processor's memory, the other processor completes the access locally, receives the address from the processor bus 16 and transfers the data from and to the processor bus 16. In addition, the processor bus 16 serves as a communication link between the processors 6 and 8. Through interprocessor communication mechanisms, each processor can address and interrupt each other processor.

In addition to the foregoing, the processor bus 16 also acts as the interface between the processor memory complexes and the first I/O subsystem 18. Through a system and bus controller 42, addresses and data are translated between the processor bus 16 and the I/O channel 20 through a set of transceivers 44, 46 (such as Model 7AAS245 transceivers manufactured by Texas Instruments Incorporated). Through this interface, the processor bus master can access the system I/O and peripherals 18 as well as the I/O expansion slots 22, 24, 26, 28, 30, 32, 34, 36, 38, 40. Still further, the processor bus 16 acts as the data path for I/O to I/O accesses. As to be more fully described later, the system and bus controller 42 generates "action codes" which format the protocol necessary for inter-device communication and enable intelligent cards plugged into an I/O expansion slot to access other I/O cards or even the processor bus memory. The system and bus controller 42, in addition to providing routing information and action code generation, also handles all processor bus 16 arbitration and interfaces all control signals to the system I/O 18 (such as ISA "commands", DMA control signals, and interrupts). Typically, the system and bus controller 42 would be a custom-made chip.

Figure 2:
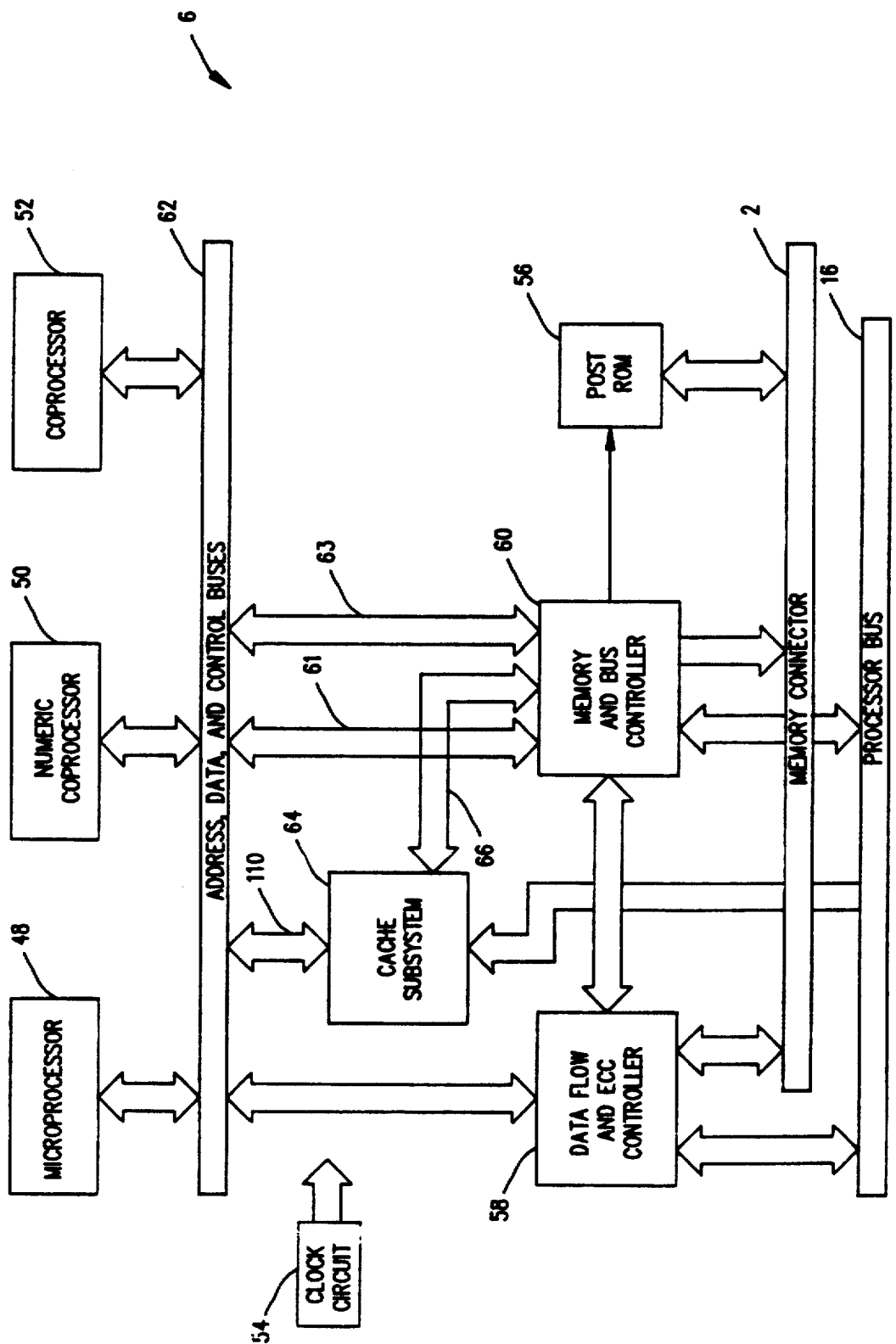
FIG. 2 is a block diagram of a processor subsystem having a cache subsystem such as could be employed in the computer system of FIG. 1.

Referring now to FIG. 2, there is shown a block diagram of the major components of the processor subsystem 6 which is preferably manufactured on a single processor card. As may be clearly seen in FIG. 1, the processor subsystem 6 interfaces with the remainder of the computer system through the memory connector 2 and the processor bus 16. Processor subsystem 6 includes a microprocessor 48 (e.g., an Intel 80386), a numeric coprocessor 50 (e.g., an Intel 80387), an optional coprocessor 52 (e.g., a Weitek 3167), a cache subsystem 64 having a selectable cache memory and constructed in accordance with the teachings of the present invention, a clock circuit 54, a power-on, selftest read only memory (or "POST ROM") 46, a data flow and ECC controller 58 and a memory and bus controller 60.

The processor subsystem 6 also includes local address, data and control buses 62 (indicated by the various arrows shown in FIG. 2) that interconnect the microprocessor 48, the coprocessors 50, 52, the cache subsystem 64, the data flow and ECC controller 58 and the memory and bus controller 60. These buses are used for local cycles such as reads by the POST ROM 56, coprocessor cycles and cache read hits. Access to the POST ROM 56 can be accomplished via operation of the data flow and ECC controller 58. For global cycles such as cache writes, cache read misses, non-cacheable cycles, and I/O cycles, however, the processor subsystem 6 must complete its access off-board.

For off-board cycles, the memory and bus controller 60 decodes the local address and control signals and determines whether the access is destined for the processor bus 16 or for the dedicated memory. For a memory cycle, the memory and bus controller 60 generates the memory control signals (i.e., row address strobe or "RAS" signals, column address strobe or "CAS" signals and write enable or "WE" signals) and addresses to access the memory card. The memory and bus controller 60 also generates refresh signals to the memory card, e.g., element 10, for each refresh period. In conjunction with the memory bus controller 60, the data flow and ECC controller 58 also performs error checking and correction.

For off-board cycles that are not destined for the memory card 10, the memory and bus controller 60 generates a processor bus request signal and takes control of the processor bus 16 when it is granted. Again, working in conjunction with the data flow and ECC controller 58, the memory and bus controller 60 completes the access to the processor bus 16.

Figure 3:
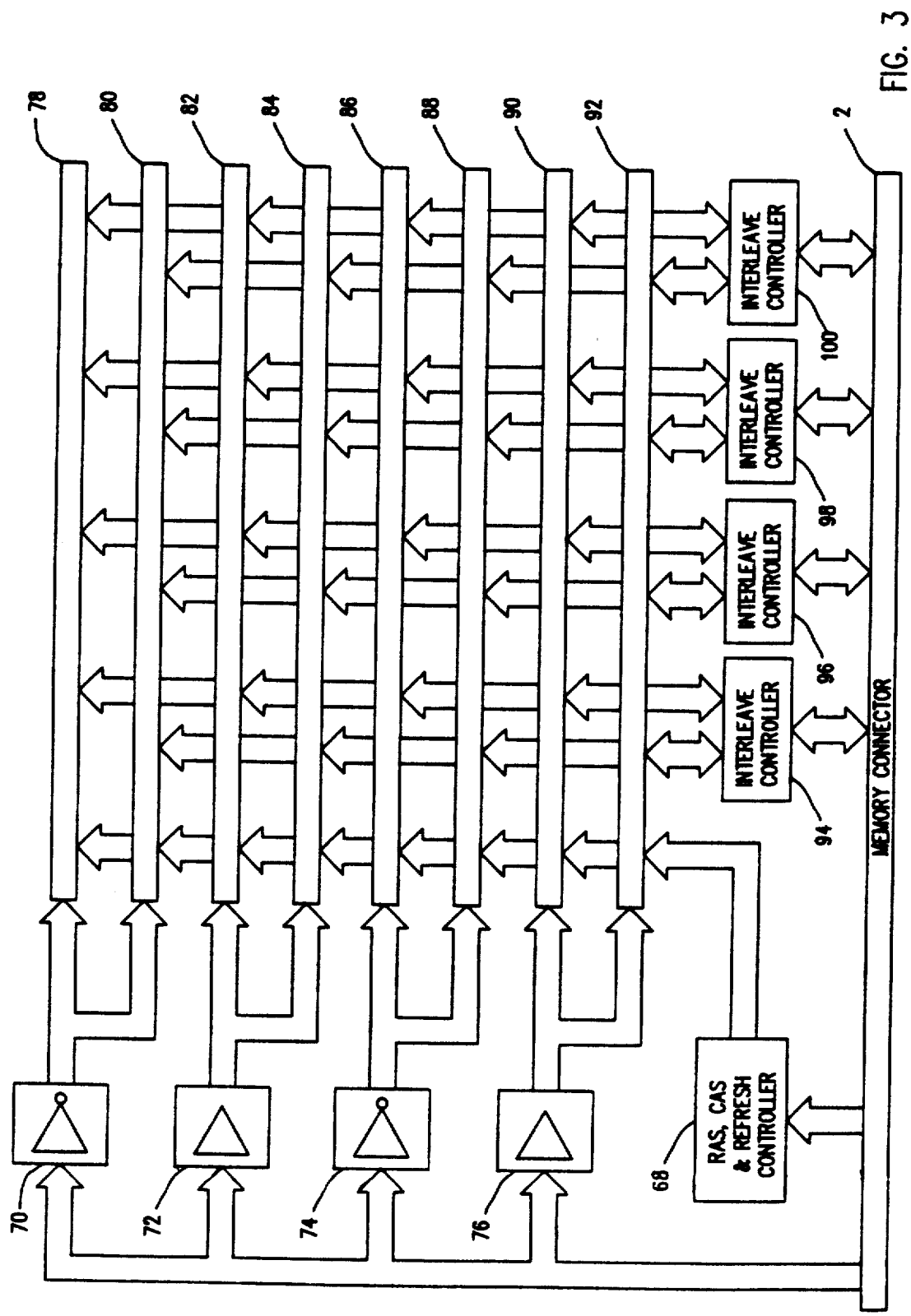
FIG. 3 is a block diagram of a memory subsystem such as could be employed in the computer system of FIG. 1.

Referring now to FIG. 3, a block diagram of the major components of the memory card 10 is set forth therein. With reference to FIG. 1, the memory card 10 interfaces to the rest of the system through the memory conductor 2. As discussed above, each memory card 10 preferably implements storage of virtual 64 bit words in the form of 2 interleaved banks of 32 bit double words, one odd and one even. Each card 10 includes a RAS, CAS, and refresh controller 68, four address buffers 70, 72, 74, 76, eight single in-line memory (SIMM) slots 78, 80, 82, 84, 86, 88, 90, 92, and four interleave controllers 94, 96, 98, 100. The RAS, CAS, and refresh controller 68, which is described in greater detail in co-pending patent application Ser. No. 07/540,049, now abandoned entitled "A Digital Computer Having a System for Sequentially Refreshing an Expandable Dynamic RAM Memory Circuit" filed Jun. 19, 1990, and hereby incorporated by reference as if reproduced in its entirety, receives control signals from the memory interface 102 (See FIG. 1), and is driven by the memory and bus controller 60 (see FIG. 2). In turn, the RAS, CAS and refresh controller 68 drives control signals to DRAM memory banks installed in the SIMM slots 78, 80, 82, 84, 86, 88, 90, 92 for reads, writes and refreshes. Preferably, the DRAM memory banks should be installed in the SIMM slots 78, 80, 82, 84, 86, 88, 90, 92 in accordance with the teaching of co-pending patent application Ser. No. 07/532,046 now abandoned entitled "Multiple DRAM Assemblies Using A Single PCB", filed May 25, 1990, and hereby incorporated by reference. Each of the four interleave controllers 94, 96, 98, 100, which are described in greater detail in co-pending patent application Ser. No. 07/530,137 entitled "Dual Path Memory Retrieval System for an Interleaved Dynamic RAM Memory Unit" filed May 25, 1990, and hereby incorporated by reference, multiplexes eight bits of data between the memory connector 2 and the SIMM slots 78, 80, 82, 84, 86, 88, 90, 92.

The data is split between even and odd banks of 32 bits of data in order to accomplish true interleaving. That is, for each read, 64-bits of data is accessed, and the four interleave controllers 94, 96, 98, 100 select 32-bit (either even or odd data) for the current access. A subsequent access can be completed in a single processor clock cycle because the second 32-bit double word is already accessed and latched. As previously mentioned, the memory card 10 includes address buffers 70, 72, 74, 76 and SIMM slots 78, 80, 82, 84, 86, 88, 90, 92. By way of example only, Model 74FCT828 and 74FCT827 data buffers manufactured by VTC could be used as the address buffers 70, 72, 74, 76. Inverting (74FCT828's) and non-inverting (74FCT827's) buffers are used to minimize the average address line signal switching to minimize electrical noise. The SIMM slots 78, 80, 82, 84, 86, 88, 90, 92 could be adapted to accommodate either 1, 2, 4 or 8 Mbyte SIMMs with parity or ECC organization.

Returning now to FIG. 2, the operation of the cache subsystem 64 will now be described in greater detail. The cache subsystem 64 functions as an extremely fast, "sketchpad-like" memory which provides rapid access to the data most frequently needed by the processor subsystem 6. In operation, the cache subsystem 64 intercepts each one of the addresses of data requested by the microprocessor 48 to see if the address of the requested data resides in a memory portion of the cache subsystem 64. If the data does reside in the memory portion of the cache subsystem 64, a state generally referred to in the art as "a hit", the requested data is immediately transmitted from the memory portion of the cache subsystem 64 to the microprocessor 48, thereby avoiding any additional wait states necessary for the microprocessor 48 to access the memory subsystem 10. The search in the memory subsystem 10 is immediately terminated via a control signal generated and passed through a control bus 66 to the memory and bus controller 60.

If, on the other hand, the data requested by the microprocessor 48 does not reside in the memory portion of the cache subsystem 64, a state generally referred to in the art as "a miss", the address of the requested data is forwarded to the memory and bus controller 60 and the data is retrieved from the memory subsystem 10. Since cache hits are serviced locally, a processor operating out of its local cache memory has a much lower "bus utilization", which reduces system bus bandwidth requirements. In the event of a miss in the cache subsystem 64, the search and retrieval of the data from the memory subsystem 10 will continue uninterrupted.

Figure 4:
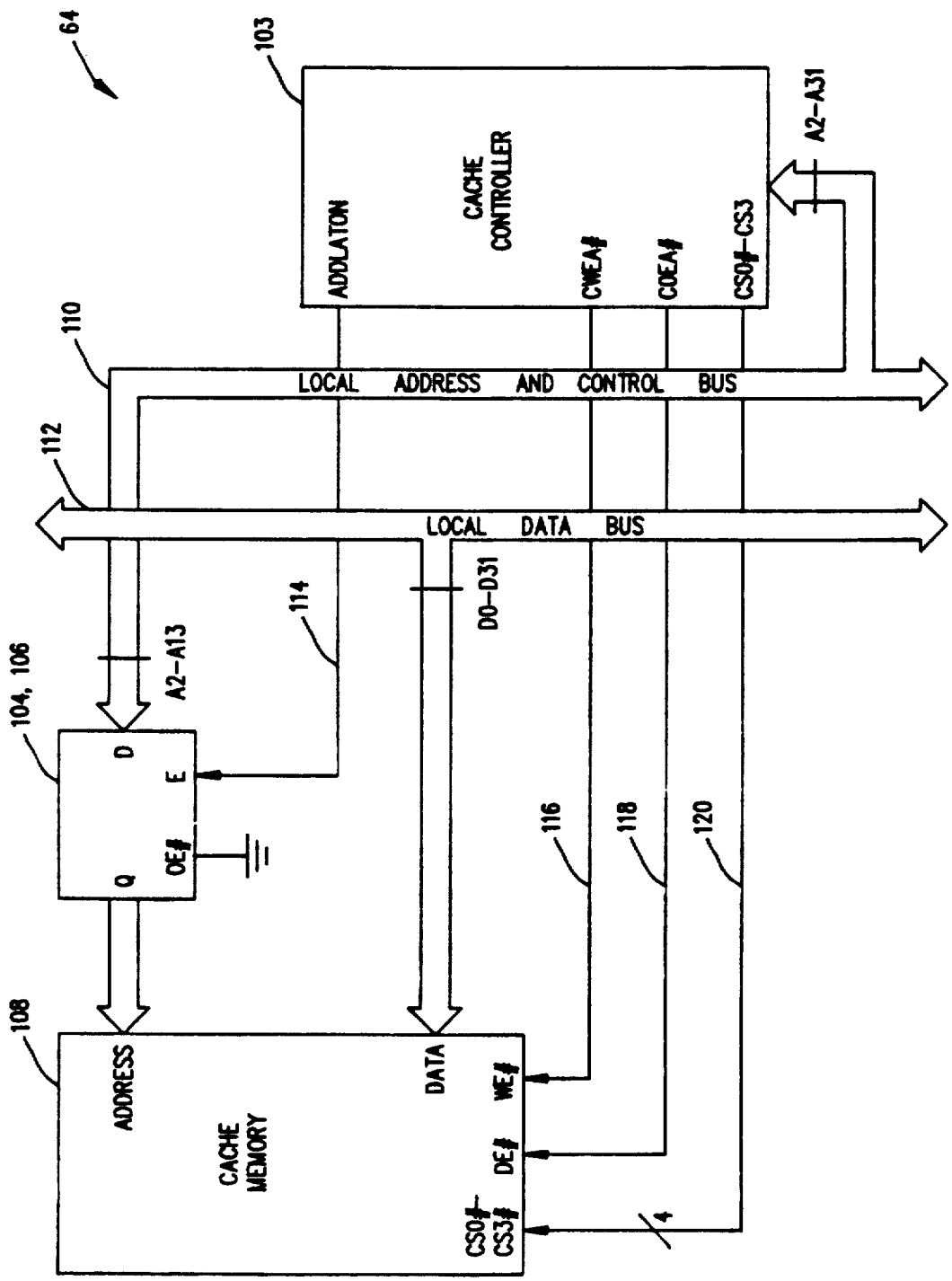
FIG. 4 is a block diagram of the cache subsystem illustrated in FIG. 2.

Referring next to FIG. 4, the cache subsystem 64 may now be seen in greater detail. The cache subsystem 64 of the processor subsystem 6 includes a cache controller 103 such as an 82385 cache controller manufactured by Intel Corporation in accordance with a first embodiment of the present invention or an A38202 Microcache manufactured by Austek Microsystems of Santa Clara, Calif. in accordance with a second, preferred embodiment of the present invention, a pair of address latches 104 and 106, preferably F series 74373 latches such as those manufactured by Intel Corporation, and a cache memory 108 which is preferably comprised of a series of static RAMs (or "SRAMS"). Preferably, the cache memory 108 should be configured to have cache line sizes of 4 double words each so that if a cacheable read is made by the processor subsystem 6, the memory and bus controller 60 returns 4 sequential double words into the cache subsystem 64 from the memory subsystem 10. While not illustrated in the drawing, the cache subsystem may also include a snoop address latch to capture each processor address that is generated and invalidate addresses if necessary. Also a programmable array logic (PAL) line extension logic would likely also be included as part of the cache subsystem to control address and control signals passing between the cache memory 108, the cache controller 103, and the memory and bus controller 60.

The cache controller 103 is provided to separate the microprocessor bus into two distinct buses: the actual microprocessor bus and the cache controller local bus. The cache controller local bus is designed to look like the front end of a microprocessor by providing a cache controller local bus equivalent to all appropriate microprocessor signals. The system interconnects to this "microprocessor like" front end just as it would to an actual microprocessor. The microprocessor simply sees a fast system bus, and the system sees a microprocessor front end with a low bus bandwidth requirement. The cache subsystem is transparent to both. Transparency, in the data communications field, refers to the capability of a communications medium to pass, within specified limits, a range of signals having one or more defined properties. It should be noted that in such systems the cache controller local bus is not simply a buffered version of the microprocessor bus, but rather, is distinct from, and able to operate in parallel with, the microprocessor bus. Thus, other bus masters, that is, supervisory systems of one kind or another residing on either the cache controller local bus or the system bus, are free to manager the other system resources while the microprocessor operates out of its cache.

Local address and control signals are transmitted from the microprocessor 48 to the cache controller 103 and the address latches 104, 106 via the local address and control bus 110. Furthermore, as the same address and control signals are used for accessing memory subsystem 10, the same address and control signals are simultaneously transmitted to the memory and bus controller 60 over an address, data and control bus 49, the address, data and control bus 62, as well as over a control bus 61 and an address bus 63.

As previously discussed, the plural SRAM cache memory 108 both stores that data from the memory subsystem 10 which the microprocessor 48 requires most frequently and transmits data stored in the cache memory 108 to the microprocessor 48 when requested. A local data bus 112 is provided for the transfer of data from the memory subsystem 10 to the cache memory 108 and from the cache memory 108 to the microprocessor 48. As data is stored in the memory subsystem 10 as two 32 bit interleaved data words, one even and one odd, the cache memory 108 is preferably comprised of 16 SRAMs, each configured to receive 4 data bits from either the 32 bit even data word or the 32 bit odd data word. As to be more fully described below, the local data bus 112 transmits data bits D0-D31 which comprise each data word, from the memory subsystem 10 to the cache memory 108. Data stored in the cache memory 108 is located utilizing a series of address signals received by the local address and control bus 110. Each SRAM which is included in the cache memory 108 receives cache address signals CA2 through CA13 from the local address and control bus 110 upon enablement by the address latches 104, 106. The cache controller, on the other hand, receives cache address signals CA2 through CA31 from the local address and control bus 110.

Control signals are transmitted from the cache controller 103 to the address latches 104, 106 via a line 114 and to the cache memory 108 via lines 116, 118 and 120. The cache controller 103 transmits a control signal ADDLAT to an E input of the address latches 104, 106. The ADDLAT signal controls the address latches 104, 106 which receive address bits A2-A13 from the cache controller 103 and address the cache memory 108. When ADDLAT is high, the address latches 104, 106 are transparent. The falling edge of ADDLAT latches the current inputs which remain applied to the addresses of the cache memory 108 until the ADDLAT signal returns to an active state.

Each SRAM which is included in the cache memory 108 also receives either an even or odd write enable (or "WE") signal transmitted by the cache controller 103 via the line 116. The WE signals are active low signals which enable the SRAM to receive data from the local data bus 112, for example during a write hit or a read miss update. Each SRAM which is included in the cache memory 108 also receives data enable (DEA for set A, or DEB for set B) signal transmitted by the cache controller 103 via the line 118. The DEA- and DEB-signals are also active low signals which enable the SRAMS to drive data stored in the cache memory 108 onto the local data bus 112. Finally, each SRAM which is included in the cache memory 108 is also tied to a cache chip select signal, either CS0, CS1, CS2 or CS3, transmitted by the cache controller 103 via the data bus 120. Each cache chip select signal CS0-CS3 is an active low signal tied to one of the cache SRAM chip select inputs for enabling the 4 bytes of the cache memory 108. More specifically, CS0 enables bits D0-D7, CS1 enables bits D8-D15, CS2 enables D16-D23 and CS3 enables data bits D24-D31. During read hits, all 4 cache bytes are enabled. Also, all 4 cache bytes are enabled in a read/miss so as to update the cache with a complete line. In a write hit, only those cache bytes which correspond to active byte enables are enabled.

Figure 5A:
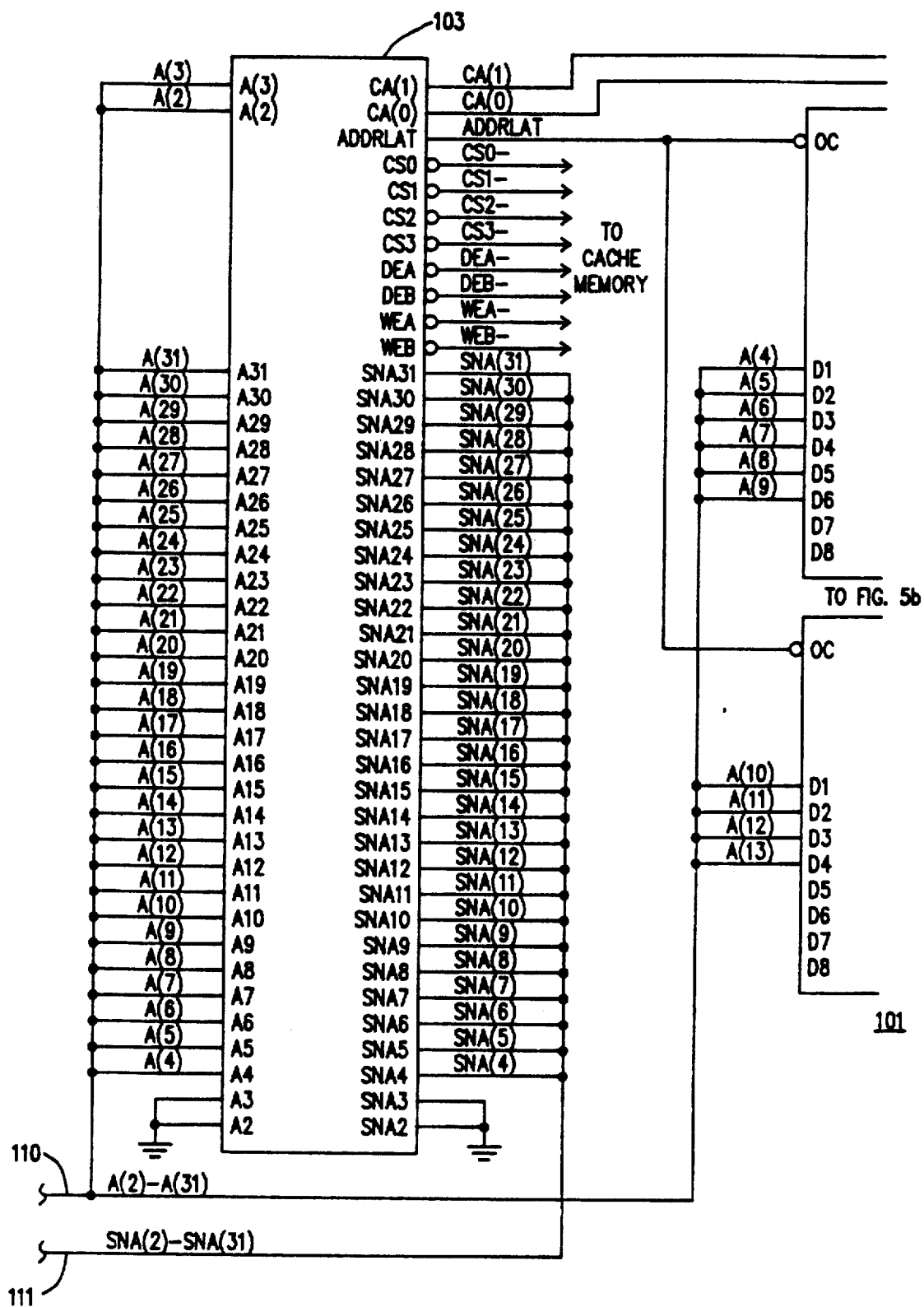
FIGS. 5a and 5b are a wiring diagram of a non-selectable 32 Kbyte cache subsystem constructed in accordance with one aspect of the present invention and which may be utilized as the cache subsystem illustrated in FIG. 4.
Figure 5B:
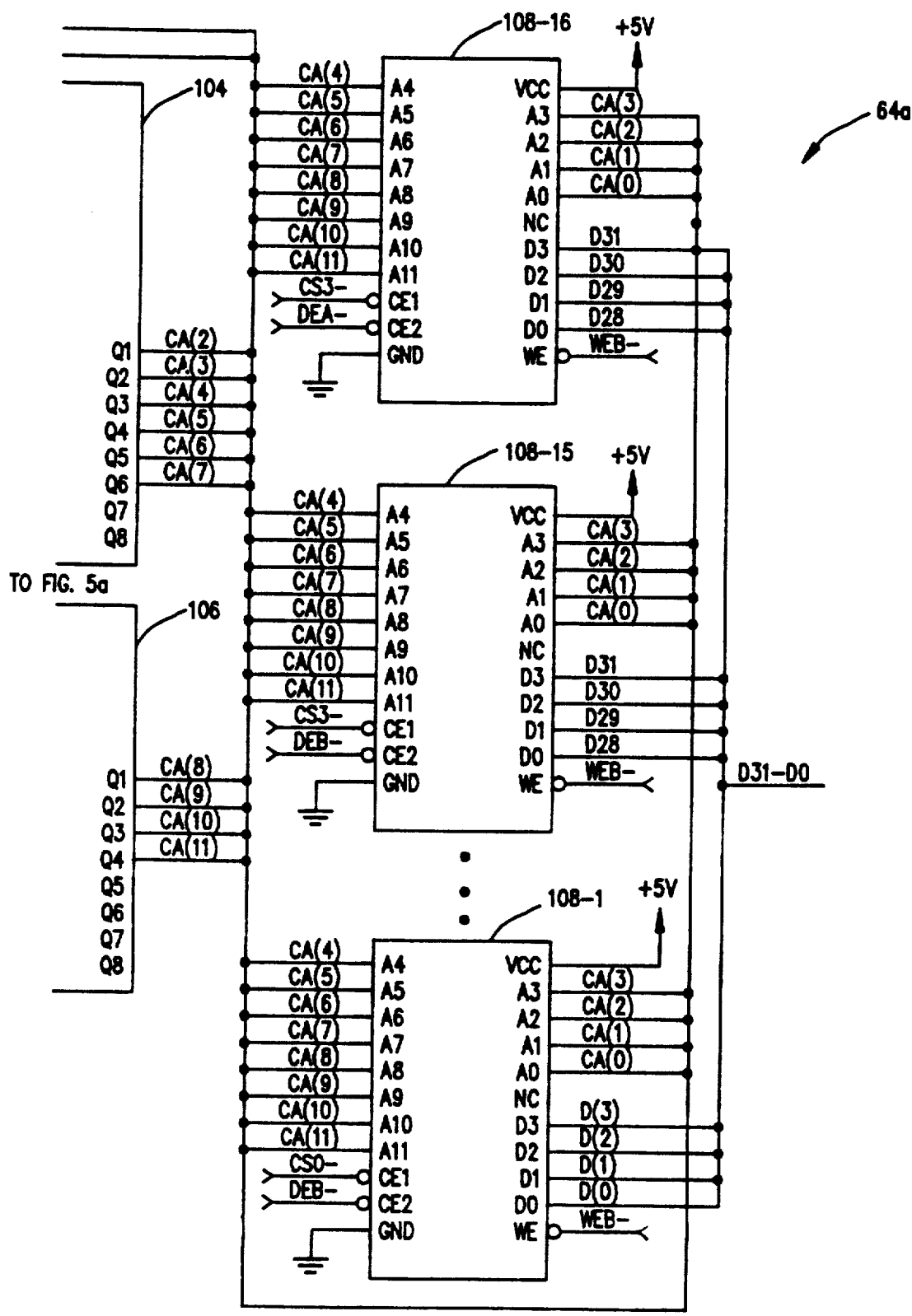

Referring next to FIG. 5, a cache subsystem 64a having a 32 Kbyte cache memory 101 and constructed in accordance with one aspect of the invention may now be seen. The 32 Kbyte cache memory subsystem 64a seen here includes a 16 byte line cache controller 103, a pair of type 74F373 address latches 104 and 106, such as those manufactured by Intel Corporation, and a series of sixteen twenty-two pin, 4K×4 SRAMS 108-1 through 108-16. It should be noted, however, that for ease of illustration, only the three SRAMs 108-1, 108-15 and 108-16 of the identically connected SRAMs 108-1 through 108-16 are shown in FIG. 5. The cache subsystem 64a is installed on a printed circuit board 101 having a series of sockets for receiving pins of the various components of the cache subsystem 64a.

The 16 byte line cache controller 103, while typically suited for servicing cache memories having 16K×4 SRAMS, is modified for use with 4K×4 SRAMS by grounding two line select bits so that, during a cache memory read cycle, the cache controller 103 will map address locations to a similar size cache memory 108-1 through 108-16. The cache controller 103 is provided with address terminals A4-A31, for receiving address location bits A(4)-A(31), respectively, from the local address bus 110. The address terminals A2 and A3 are grounded. The cache controller 103 is also provided with address terminals A(2) and A(3) for receiving address location bits A(2) and A(3), respectively, cache address terminals CA(0) and CA(1) for generating control signals to the SRAMS 108-1 through 108-16, as well as cache chip select terminals CS0, CS1, CS2, and CS3, data output enable terminals DEA and DEB and write enable terminals WEA and WEB for generating the control signals described with respect to FIG. 4 to corresponding odd or even SRAMs 108-1 through 108-16. Finally, the cache controller 103 is provided with snoop address terminals SNA2-SNA31, of which snoop address terminals SNA2 and SNA3 are grounded and snoop address terminals SNA4-SNA31 are respectively connected to the corresponding snoop address bit SNA(4)-SNA(31) via a local snoop address bus 111.

The address latches 104 and 106 are each provided with eight input (or "D") terminals D1-D8, eight output (or "Q") terminals Q1-Q8 and a latch enable terminal OC. The D1-D6 terminals of the address latch 104 are connected to receive the address bits A(4)-A(9), respectively, from the address and control bus 110. The terminals D7 and D8 are unconnected. The latched cache address signals CA(2)-CA(7) are output from the address latch 104 terminals Q1-Q6, respectively. The Q7 and Q8 terminals are uncorrected. For the address latch 106, the D1, D2, D3 and D4 terminals are connected to the address bits A(10), A(11), A(12) and A(13), respectively, from the address and control bus 110. The terminals D5, D6, D7, and D8 are unconnected. The latched cache address signals CA(8), CA(9), CA(10) and CA(11) are output from the terminals Q1, Q2, Q3 and Q4, respectively, of the address latch 106.

Each SRAM 108-1 through 108-16 has a series of data terminals D0, D1, D2 and D3, a series of address terminals A0-A11 for receiving the corresponding one of the latched cache address signals CA(0)-CA(11), from the address latches 104, 106, a series of control signal terminals CE1, CE2 and WE, a single unconnected terminal NC and a $V_{cc}$ terminal tied to a +5 Volts. Data terminals D0-D3 supply data from the memory subsystem 10 to the cache memory SRAMs 108-1 through 108-16 via the local data bus 112. Each of the cache memory SRAMs 108-1 through 108-16 is provided with 4 data bits from either the 32 bit even data word or the 32 bit odd data word. For example, the cache memory SRAMs 108-1, 108-3, 108-5, 108-7, 108-9, 108-11, 108-13 and 108-15 are tied to odd memory banks of the memory subsystem 10 and the cache memory SRAMs 108-2, 108-4, 108-6, 108-8, 108-10, 108-14, and 108-16 are tied to even memory banks of the memory subsystem 10. More specifically, the SRAM 108-1 receives data bits D0-D3 for the 32 bit odd data word, the SRAM 108-2 (not shown) receives data bits D0-D3 for the 32 bit even data word, the SRAM 108-3 (not shown) receives data bits D4-D7 for the 32 bit odd data word, the SRAM 108-4 (not shown) receives data bits D4-D7 for the 32 bit even data word, the SRAM 108-5 (not shown) receives data bits D8-D11 for the 32 bit odd data word, the SRAM 108-6 (not shown) receives data bits D8-D11 for the 32 bit even data word, the SRAM 108-7 (not shown) receives data bits D12-D15 for the 32 bit odd data word, the SRAM 108-8 (not shown) receives data bits D12-D15 for the 32 bit even data word, the SRAM 108-9 (not shown) receives data bits D16-D19 for the 32 bit odd data word, the SRAM 108-10 (not shown) receives data bits D16-D19 for the 32 bit even data word, the SRAM 108-11 (not shown) receives data bits D20-D23 for the 32 bit odd data word, the SRAM 108-12 (not shown) receives data bits D20-D23 for the 32 bit even data word, the SRAM 108-13 (not shown) receives data bits D24-D27 for the 32 bit odd data word, the SRAM 108-14 (not shown) receives data bits D24-D27 for the 32 bit even data word, the SRAM 108-15 receives data bits D28-D31 for the 32 bit odd data word and the SRAM 108-16 receives data bits D28-D31 for the 32 bit even data word.

Each 4K×4 SRAM has a cache chip select signal, either CS0-, CS1-, CS2-or CS3- which is received by the corresponding one of the CS0, CS1, CS2 or CS3 terminals on the cache controller 103. Each cache chip select signal CS0-through CS3- is an active low signal received by the cache SRAM chip select for enabling the 4 bytes of the 32 bit wide cache. Specifically, CS0- enables bits D0-D7, CS1- enables bits D8-D15, CS2- enables D16-D23 and CS3- enables data bits D24-D31.

During read hits, all 4 bytes are enabled. Also, all 4 cache bytes are enabled in a read/miss so as to update the cache with a complete line. In a write hit, only those cache bits that correspond to active byte enables are selected. Accordingly, the cache memories 108-1, 108-2, 108-3, and 108-4 are tied to the CS0 terminal of the cache controller 103, the cache memories 108-5, 108-6, 108-7 and 108-8 are tied to the CS1 terminal of the cache controller 103, the cache memories 108-9, 108-10, 108-11 and 108-12 are tied to the CS2 terminal of the cache controller 103, and the cache memories 108-13, 108-14, 108-15 and 108-16 are tied to the CS3 terminal of the cache controller 103. Each SRAM 108-1 through 108-16 is also tied to the DEA or DEB terminals of the cache controller 103 for receiving the cache controller signals DEA- and DEB-. The DEA- and DEB- signals are active low signals for respectively enabling cache bank A or B to drive the data bus. For any two-way associative cache such as the one described above, either DEA- or DEB- will be active during a read hit, depending on which bank is selected.

Each of the SRAM 108-1 through 108-16 is also providry with either a write enable signal WEA- (if it is an even bank) or a WEB-signal (if it is an odd memory bank) tied to respective WEA and WEB terminals on the cache controller 103. The write enable signals respectively enable even or odd cache banks to receive data from the databus, for example during a write hit or a read miss update. Each SRAM 108-1 through 108-16 also includes 12 cache address connections CA(1) through CA(12).

Figure 6:
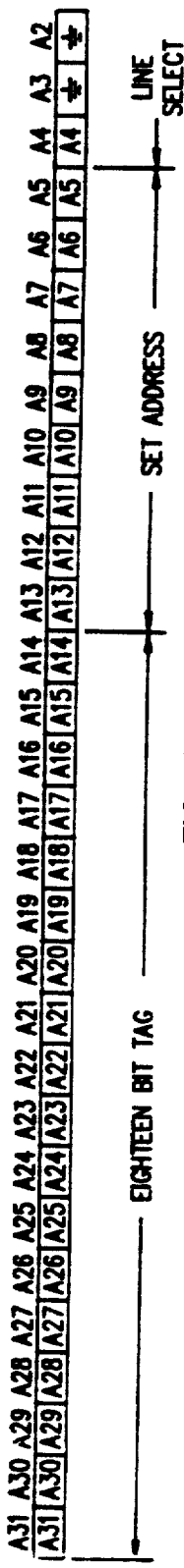
FIG. 6 is an address bus bit field which corresponds to the cache subsystem of FIG. 5.

Referring next to FIG. 6, an address bus bit field for the 32 Kbyte cache memory subsystem 64a illustrated in FIG. 5 may now be seen. The address bus bit field for the 32 Kbyte cache memory subsystem 64a is comprised of an 18 bit tag, a 9 bit set address and a 3 bit line select address. When the microprocessor 48 requests data from the memory subsystem 10, the microprocessor 48 will transmit address location information bits A2 through A31 to the address bus 110. As illustratively constructed herein, the cache controller 103 produces the address bus bit field which acts as a directory which may be utilized by the cache to determine whether the desired memory entry resides in the cache memory. Bits A14 through A31 (the tag) indicate which "page" of the total $2^{18}$ pages of information within the memory subsystem 10 the desired memory entry is located, bits A5 through A13 (the "set") indicate within which of the possible 512 ($2^9$) sets of double words which comprises each page the desired memory entry is located, and the bit A4 determines within which of the two possible lines the desired memory entry is located.

Figure 7A:
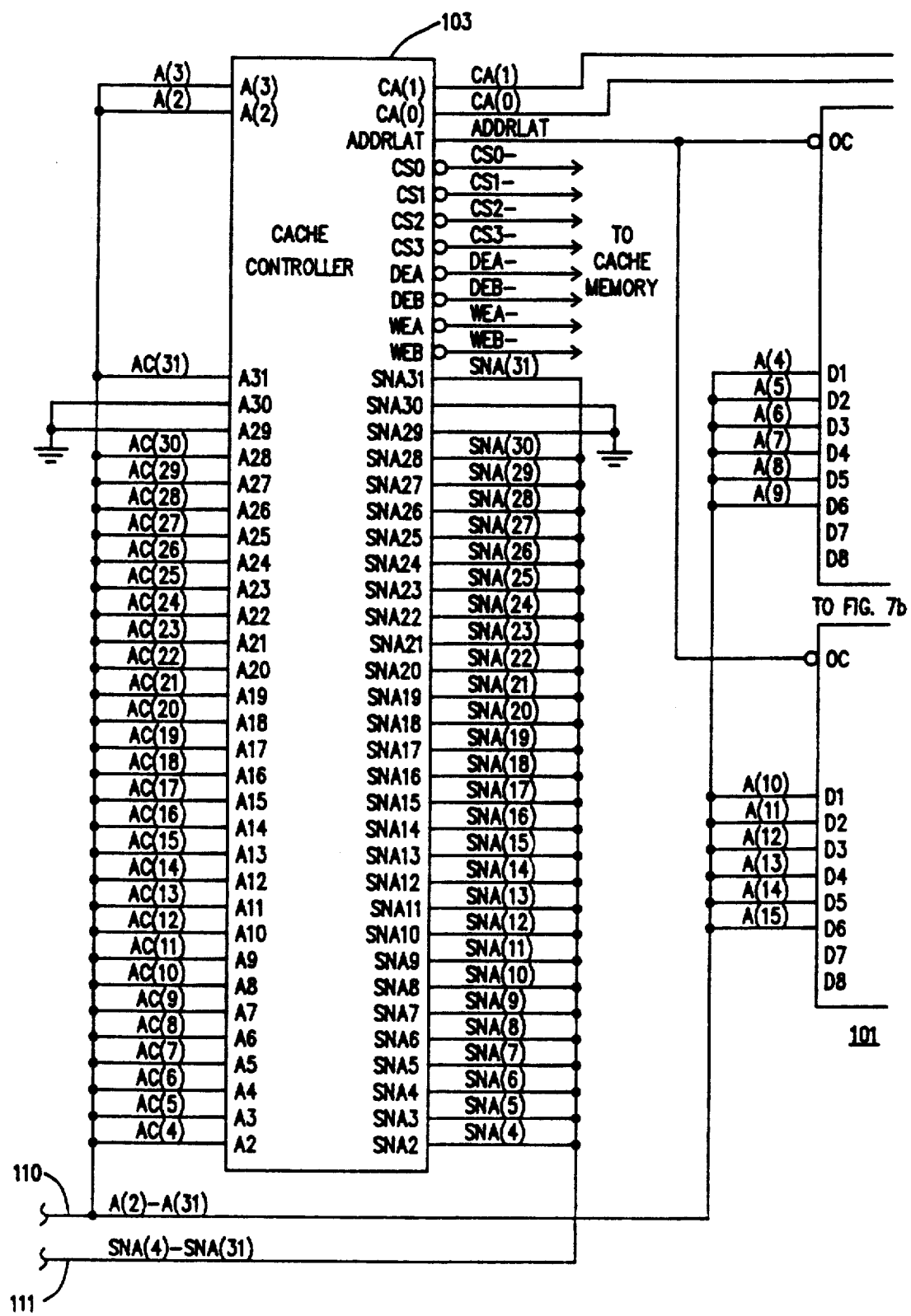
FIGS. 7a and 7b are a wiring diagram of a non-selectable 128 Kbyte cache subsystem constructed in accordance with another aspect of the present invention and which may also be utilized as the cache subsystem illustrated in FIG. 4.
Figure 7B:
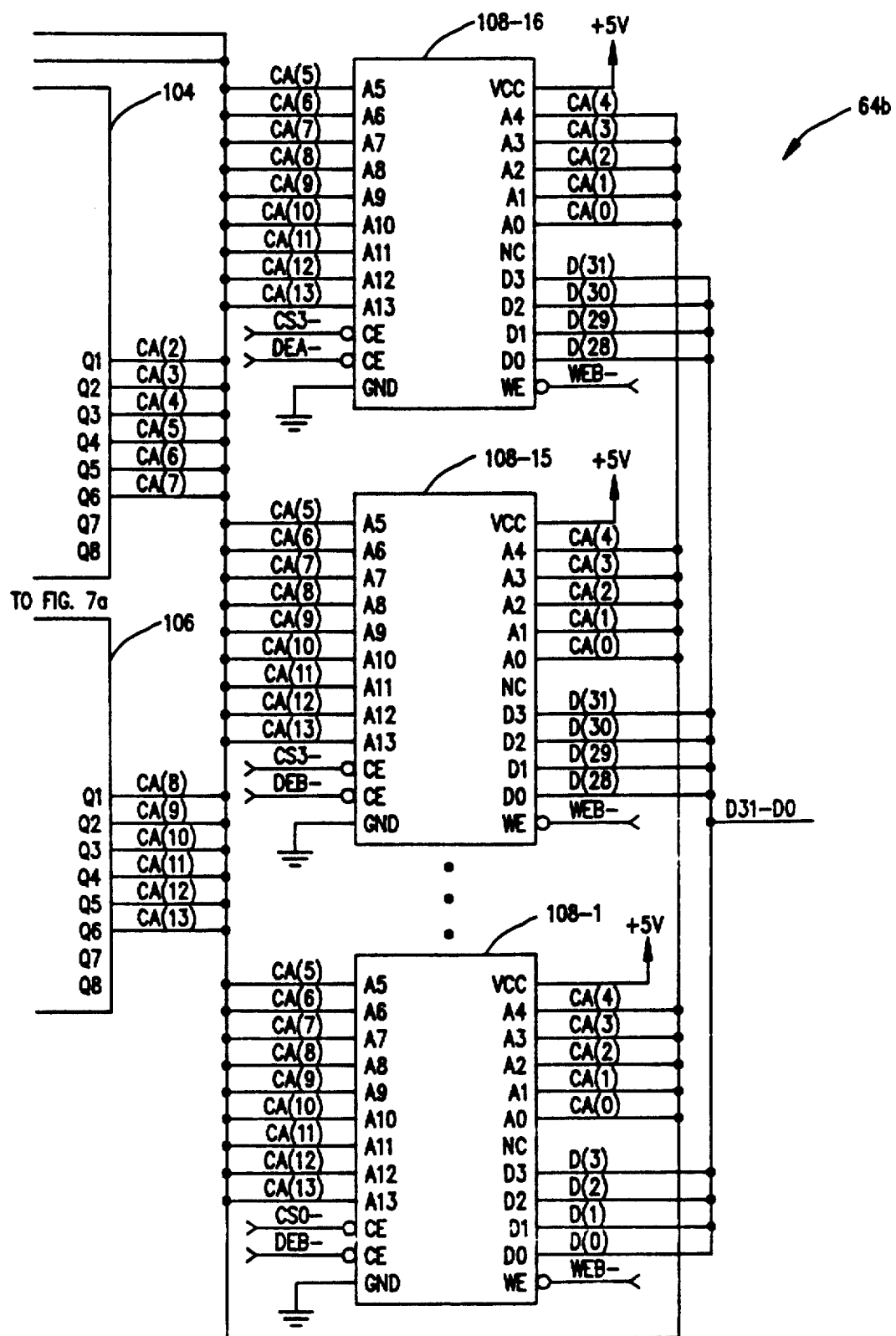

Referring next to FIG. 7, a second cache subsystem having a 128 Kbyte cache memory 106 and constructed in accordance with another aspect of the invention may now be seen. The 128 Kbyte cache memory subsystem 64b seen here includes a 16 byte line cache controller 103, a pair of type 74F373 address latches 104 and 106 and a series of sixteen twenty-four pin, 16K×4 SRAMS 108-1 through 108-16. Again, for ease of illustration, only three of the identically connected SRAMs 108-1 through 108-16 are shown in FIG. 7. The cache subsystem 64b is installed on a printed circuit board 101 having a series of sockets for receiving pins of the various components of the cache subsystem 64b. Furthermore, as the interconnections between the various components of the 128 Kbyte cache subsystem 64b illustrated in FIG. 7 and the 32 Kbyte cache subsystem 64a illustrated in FIG. 5 are often identical, only those connections of the 128 Kbyte cache subsystem 64b which differ from the 32 Kbyte cache subsystem 64a shall be hereafter described.

The 16 byte line cache controller 103, which, in the cache subsystem 64a required modification for servicing cache memories having 4K×4 SRAMs, no longer requires such modification as the cache memory being serviced is now comprised of 16K×4 SRAMS. The address terminals A29 and A30 of the cache controller 103 are now tied to ground. The address terminals A2 and A3 have been disconnected from ground and now receive address location bits A(4) and A(5), respectively, from the local address bus 110. The snoop address connections for the cache controller 103 have been similarly modified. The snoop address terminals SNA29 and SNA30 have now been tied to ground. The snoop address terminals SNA2 and SNA3 have been disconnected from ground and now receive snoop address location bits SNA(4) and SNA(5), respectively, from the local snoop address bus 111.

The input terminals D5 and D6 of the address latch 106 are now connected to the address location bits A(14) and A(15) from the local address bus 110. Similarly, the output terminals Q5 and Q6 from the address latch 106 now output a latch address signal CA(12) and CA(13) to terminals A12 and A13 of the SRAMs 108-1 through 108-16.

Figure 8:
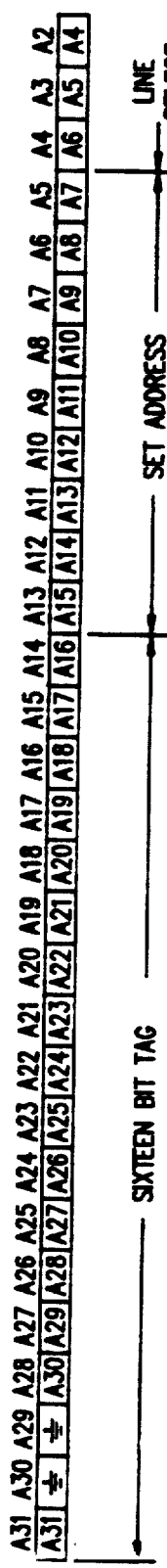
FIG. 8 is an address bus bit field which corresponds to the cache subsystem of FIG. 7.

Referring next to FIG. 8, an address bus bit field for the 128 Kbyte cache memory subsystem 64b illustrated in FIG. 7 may now be seen. The address bus bit field for the 128 Kbyte cache memory subsystem 64 is comprised of an 16 bit tag, a 9 bit set address and a 3 bit line select address. When the microprocessor 48 requests data from the memory subsystem 10, the microprocessor 48 will transmit address location information bits A2 through A31 to the address bus 110. Bits A14 through A31 (the "tag") indicate which "page" of the total $2^{18}$ pages of information within the memory subsystem 10 the desired memory entry is located, bits A7 through A15 (the "set") indicate within which of the possible 512 ($2^9$) sets of double words which comprises each page the desired memory entry is located, and the bits A4 through A6 (the "line") determine which of the eight possible lines the desired memory entry is located.

Figure 9A:
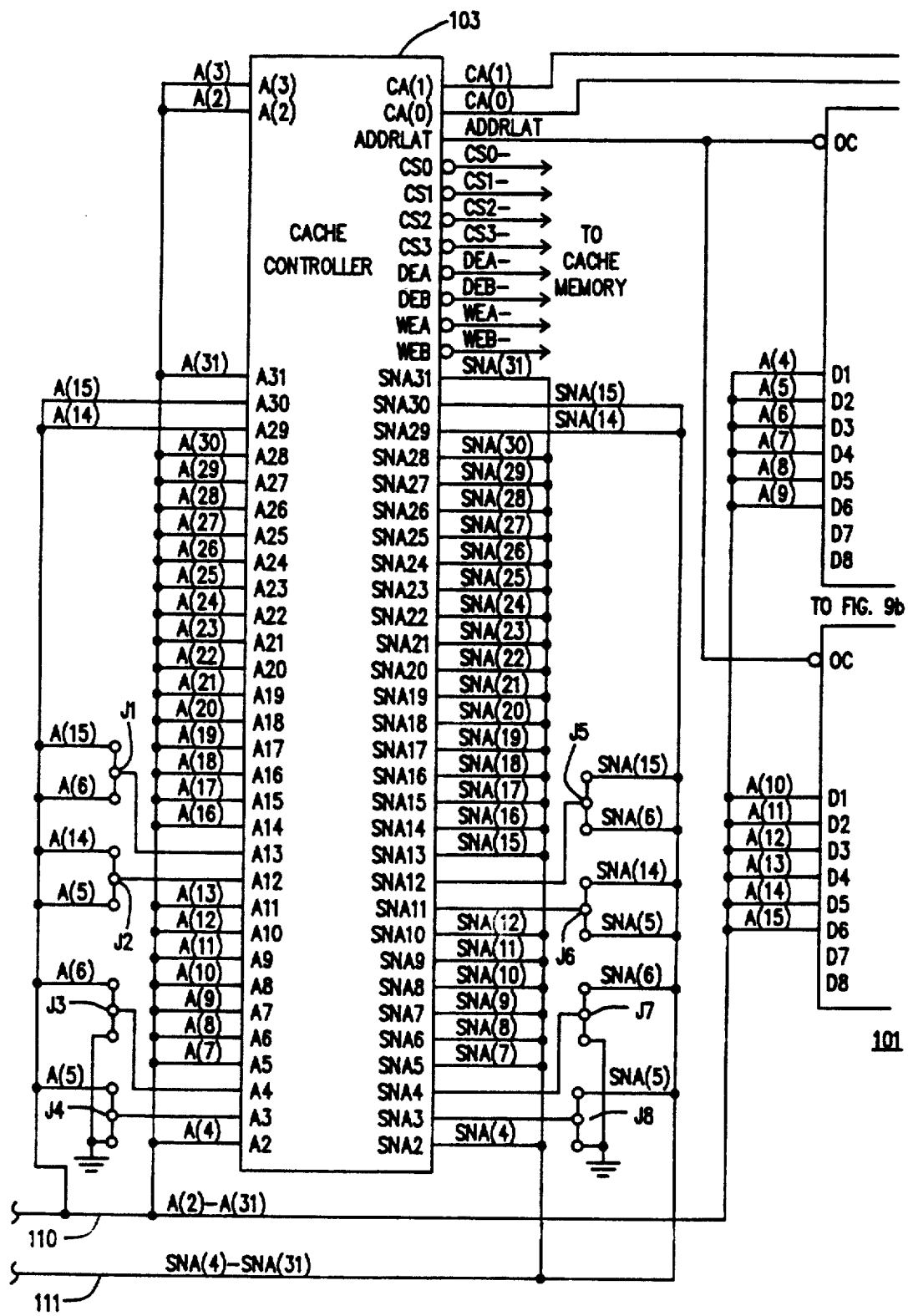
FIGS. 9a and 9b are a wiring diagram of a first embodiment of a selectable 32 or 128 Kbyte configurable cache subsystem constructed in accordance with the teachings of the present invention and which may be utilized as the cache subsystem illustrated in FIG. 4.
Figure 9B:
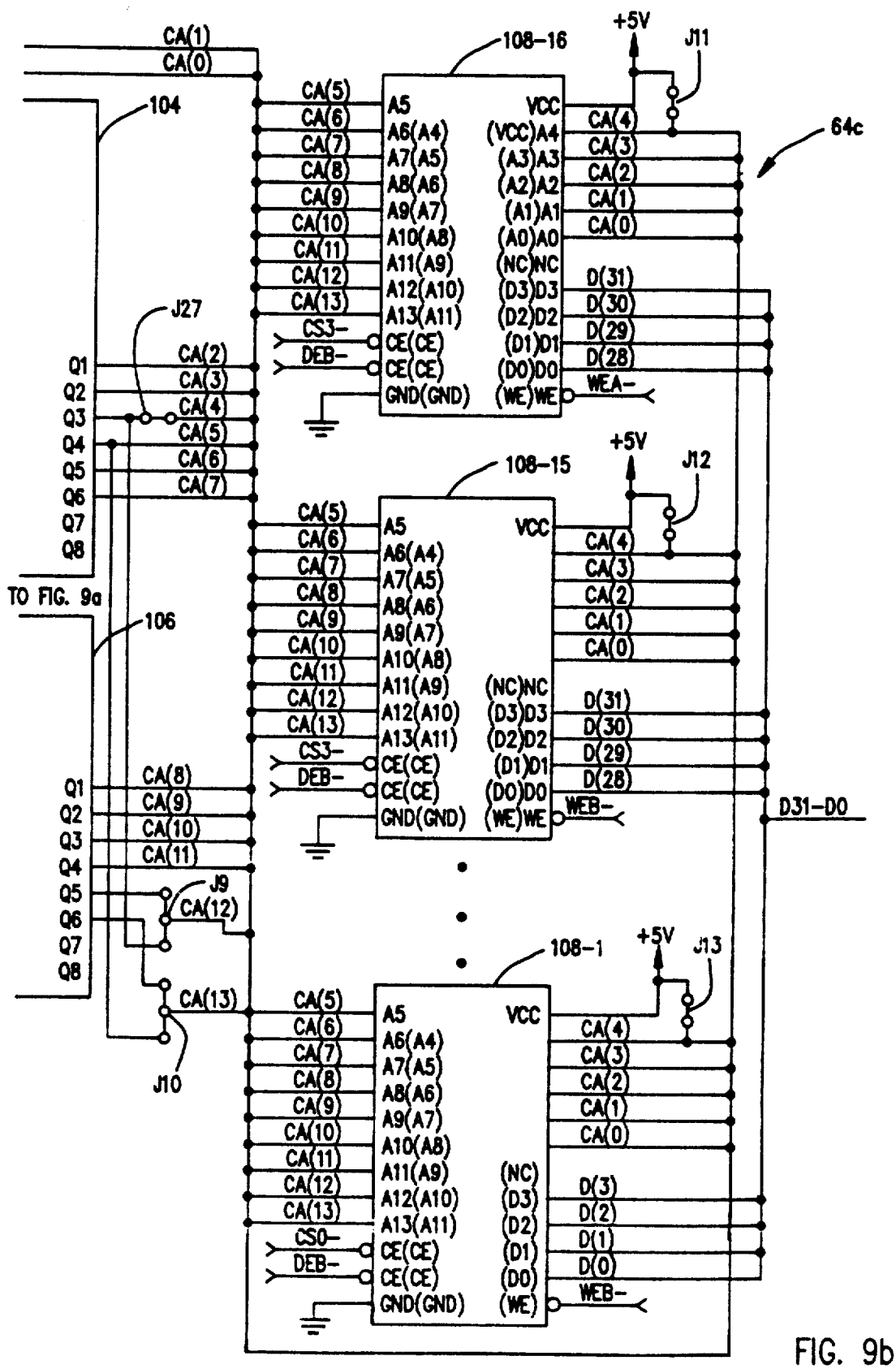

Referring next to FIG. 9, a first embodiment of a selectable 32 or 128 Kbyte cache memory configuration constructed in accordance with the teachings of the present invention may now be seen. Similar to the 32 Kbyte cache subsystem illustrated in FIG. 5 and the 128 Kbyte cache subsystem illustrated in FIG. 7, the 32/128 cache subsystem configuration includes a cache controller 103, in this embodiment a Model 82835 cache controller manufactured by Intel Corporation, a pair of address latches 104 and 106 and a series of 16 SRAMs 108-1 through 108-16. Again, only those interconnections between the various components of the 32/128 Kbyte cache subsystem 64c which differ from the 128 Kbyte cache subsystem 64b and the 32 Kbyte cache subsystem 64a illustrated in FIG. 5 shall be discussed herein.

To implement the 32/128 Kbyte selectable cache subsystem 68c, with the single printed circuit board 101, 27 sets of jumper pads J1 through J27 are provided at various locations throughout the cache subsystem 64c. Preferably, each two-way jumper pad pair J-11 through J-27 consists of a pair of 25 mil×75 mil oval pads configured for receiving a surface mounted zero ohm shunt therebetween (shown in phantom in FIG. 9). Similarly, each three-way jumper pad triplet J1 through J10 consists of three 25 mil×75 mil oval pads (a top pad, a middle pad and a lower pad) configured for receiving a surface mounted zero ohm shunt (also shown in phantom in FIG. 9) between either the top and the middle pads or the middle and the bottom pads. The position of the shunts in the three-way jumper pad triplets J1–J10 or whether the corresponding shunt is installed between the jumper pad pairs J-11 through J-27 will determine the size of the cache subsystem 64c upon assembly. Contrasting the 128 Kbyte cache subsystem 64b illustrated in FIG. 7 with the 128 configuration of the selectable 32/128 Kbyte cache subsystem 64c illustrated in FIG. 9, the selectable 32/128 Kbyte cache subsystem 64c is the same except that the terminals A29 and A30 of the cache controller 103 receive address bits A14 and A15, respectively from the local address bus 110. Similarly, the snoop terminals SNA29 and SNA30 of the cache controller 103 receive snoop addresses SNA14 and SNA15 from the local snoop address bus 111.

The address bits input to the terminals A3, A4, A12 and A13 vary depending on whether the cache subsystem 64c is selected to be a 128 Kbyte configuration or a 32 Kbyte configuration. If the 32 Kbyte configuration is selected, a shunt is placed between the middle and lower pads of each of the three-way jumper pad triplets J1, J2, J3 and J4. In this configuration, the terminals A3 and A4 of the cache controller 103 are tied to ground and the terminals A12 and A13 of the cache controller are tied to address bits A(5) and A(6), respectively. If the 128 Kbyte configuration is selected, a shunt is placed between the upper and middle pads of each of the three-way jumper pad triplets J1, J2, J3 and J4. In this configuration, the terminals A3 and A4 of the cache controller are connected to receive address bits A(5) and A(6) and the terminals A12 and A13 of the cache controller 103 are connected to receive address bits A(14) and A(15), respectively. For the snoop address terminals of the cache controller 103, if the 32 Kbyte configuration is selected, a shunt is placed between the middle and lower pads of each of the three-way jumper pad triplets J5, J6, J7 and J8. In this configuration, the terminals SNA3 and SNA4 of the cache controller 103 are tied to ground and the terminals SNA12 and SNA13 of the cache controller are connected to receive address bits SNA(5) and SNA(6). If the 128 Kbyte configuration is selected, a shunt is placed between the upper and middle pads of each of the three-way jumper pad triplets J5, J6, J7 and J8. In this configuration, the terminals SNA3 and SNA4 of the cache controller are connected to receive snoop address bits SNA(5) and SNA(6) and the terminals SNA12 and SNA13 of the cache controller 103 are connected to receive the snoop address bits SNA(14) and SNA(15).

The latched cache address signals output by the address latches 104, 106 are directed to different locations depending on whether the cache subsystem 64c is selected to be a 128 Kbyte configuration or a 32 Kbyte configuration. If the 32 Kbyte configuration is selected, a shunt is placed between the middle and lower pads of each of the three-way jumper pad triplets J9 and J10. In this configuration, the latched address output by the terminal Q4 of the address latch 104 is provided as latched address signal CA(13) and the latched address output by the terminal Q3 of the address latch 106 is provided as latched address signal CA(12). In the 32 Kbyte configuration, the two-way jumper pad pair J27 is left open to isolate $V_{cc}$ from the static RAMs 108-1 through 108-16. If, on the other hand, the 128 Kbyte configuration is selected, a shunt is placed between the upper and middle pads of each of the three-way jumper pad triplets J9 and J10 and yet another zero ohm shunt is placed across the two-way jumper pad pair J27. In this configuration, the latched address output by the terminal Q6 of the address latch 106 is provided as latched address signal CA(13) and the latched address output by the terminal Q5 of the address latch 106 is provided as latched address signal CA(12).

Finally, to complete the implementation of a 32 Kbyte cache subsystem 64c, a twenty-two pin 4K×4 static RAM is provided for each of the static RAMs 108-1 through 108-16. As the printed circuit board 101 is provided with a series of groups of twenty-four sockets (not shown), each group of sockets to be utilized for the installation of one of the static RAMs 108-1 through 108-16, each of the twenty-two pin 4K×4 static RAMs 108-1 through 108-16 are installed in the lower twenty-two sockets of the corresponding group of twenty-four sockets. To provide the +5 volts $V_{cc}$ necessary to power each static RAM 108-1 through 108-16, a two-way jumper pad pair J11 through J26 is provided between the $V_{cc}$ terminal and the A4 terminal of each static RAM 108-16 through 108-1 and a shunt is installed between each pad pair J11 through J26, thereby jumpering $V_{cc}$ to the A4 terminal (the twenty-second terminal) of the 4K×4 static RAMs 108-1 through 108-16.

To implement a 128 Kbyte cache, twenty-four pin, 16K×4 static RAMs 108-1 through 108-16 are installed in the series of groups of twenty-four sockets. The $V_{cc}$ shunts across the two-way jumper pad pairs J11 through J-26 are not installed.

Figure 10:
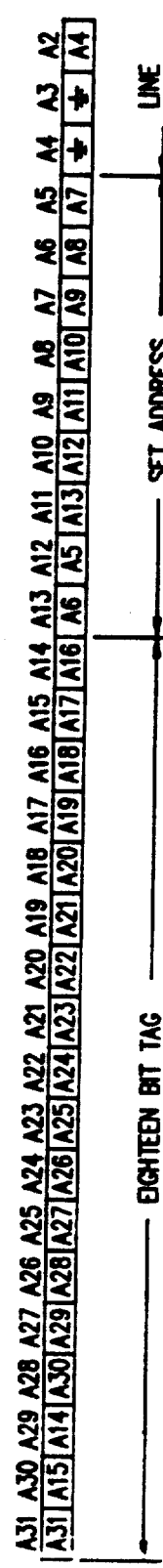
FIG. 10 is an address bus bit field which corresponds to the cache subsystem of FIG. 9 configured with a 32 Kbyte cache memory.

Referring next to FIG. 10, an address bus bit field for the cache subsystem 64c illustrated in FIG. 9 when the cache subsystem 64c is selected to be a 32 Kbyte cache subsystem may now be seen. Again, the address bus bit field for the 32 Kbyte cache memory subsystem 64c is comprised of an 18 bit tag address field, a 9 bit set address field and a 1 bit line select address field. The address bus bit field produced by the 32 Kbyte cache subsystem 64c differs from that produced by the 32 Kbyte cache subsystem 64a only in that two bits of the eighteen bit tag address field and two bits of the nine bit set address field have been reordered as follows. In the tag address field, address bits A15 and A14 are routed to address bits A30 and A29, respectively, and address bits A30 through A16 are shifted down to bits A28 through A14, respectively.

Figure 11:
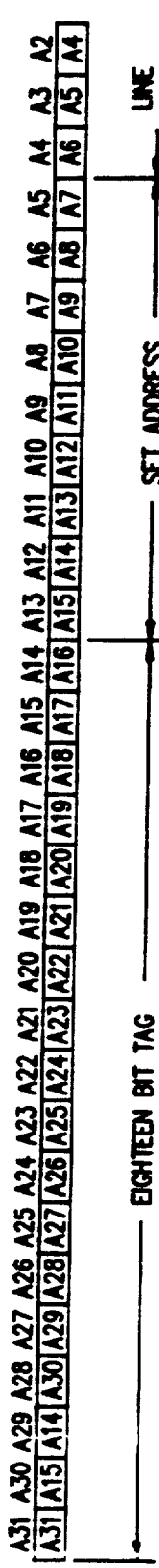
FIG. 11 is an address bus bit field which corresponds to the cache subsystem of FIG. 9 configured with a 128 Kbyte cache memory.

Referring next to FIG. 11, an address bus bit field for the cache subsystem 64c illustrated in FIG. 9 when the cache subsystem 64c is selected to be a 128 Kbyte cache subsystem may now be seen. Again, the address bus bit field for the 128 Kbyte cache memory subsystem 64c is comprised of an 18 bit tag address field, a 9 bit set address field and a 3 bit line select address field. The address bus bit field produced by the 128 Kbyte cache subsystem 64c differs from that produced by the 128 Kbyte cache subsystem 64b as follows. The sixteen bit tag address field illustrated in FIG. 8 is expanded to eighteen bits by the substitution of A14 and A15 for grounded terminals A29 and A30. While bits A14 and A15 are actually set address field bits, their placement in the tag address field as well merely acts as a double check of the set address location. The set address and line select address fields are unchanged from the previous 128 Kbyte address bus bit field of FIG. 8.

Thus, the 32/128 Kbyte selectable cache subsystem illustrated in FIG. 9 produces address bus bit fields very similar to the address bus bit fields of the non-selectable 32 Kbyte and non-selectable 128 Kbyte cache subsystems illustrated in FIGS. 5 and 7, respectively. The differences between the address bus bit fields for the non-selectable and selectable 32 Kbyte cache subsystems discussed above, i.e. the reordering of bit locations within the field, will not cause the selectable cache subsystem to operate improperly since address bus bit positions are interchangeable. Similarly, comparing the non-selectable and selectable 128 Kbyte cache subsystems, the only difference is that a pair of address bits are placed in both the page and set address fields. Again, this redundancy does not affect operation but it merely serves as a double check. Thus, the installation of 4K×4 SRAMs or 16K×4 SRAMs, the proper installation of 11 or 26 zero ohm shunts and the reordering of the addresses and address bus bit fields set forth above will allow a single printed circuit board to function properly as both a 32 Kbyte cache subsystem or a 128 Kbyte cache subsystem.

Figure 12A:
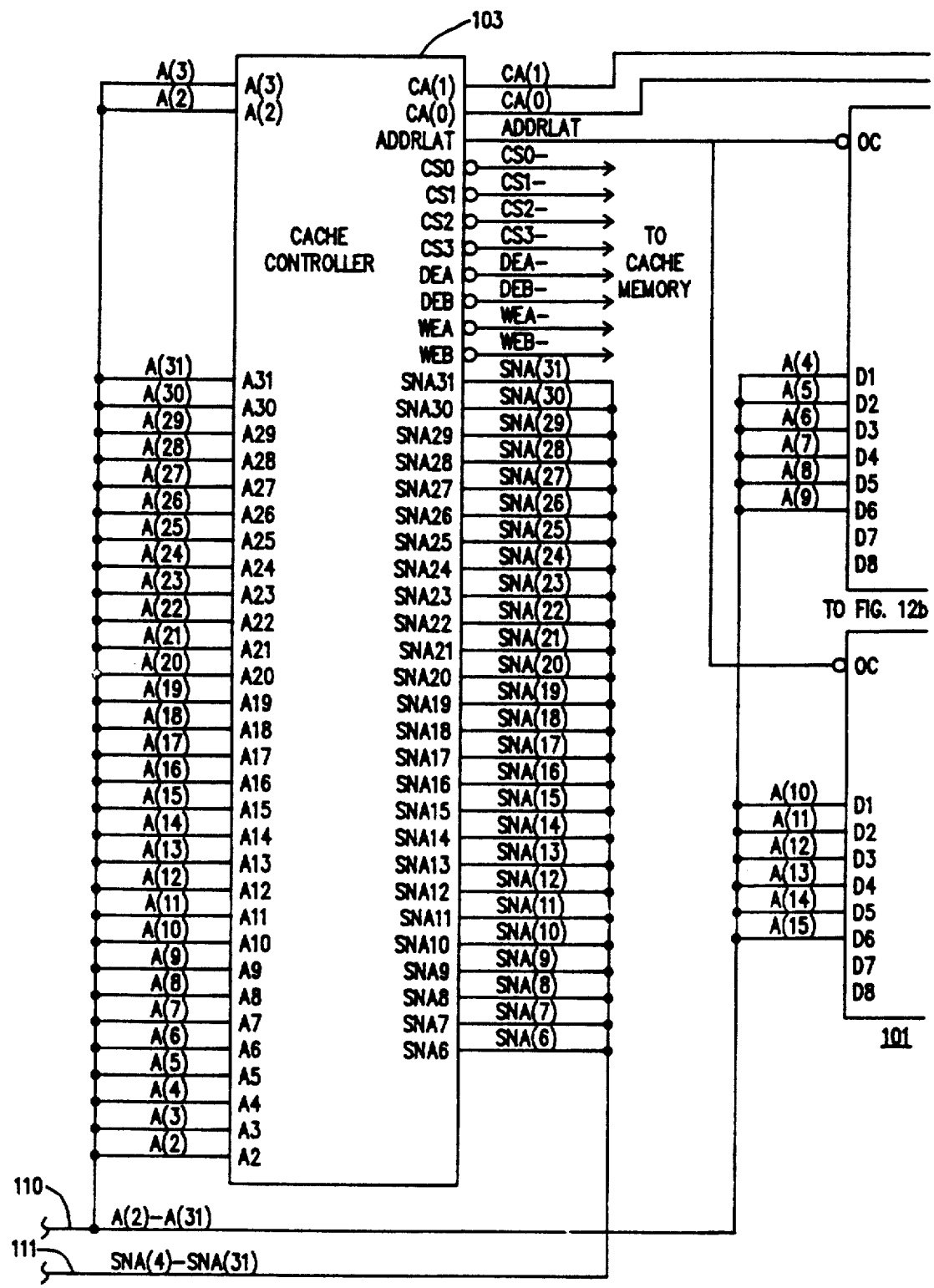
FIGS. 12a and 12b are a wiring diagram of a second, preferred embodiment of a selectable 32 or 128 Kbyte configurable cache subsystem constructed in accordance with the teachings of the present invention and which may also be utilized as the cache subsystem illustrated in FIG. 4.
Figure 12B:
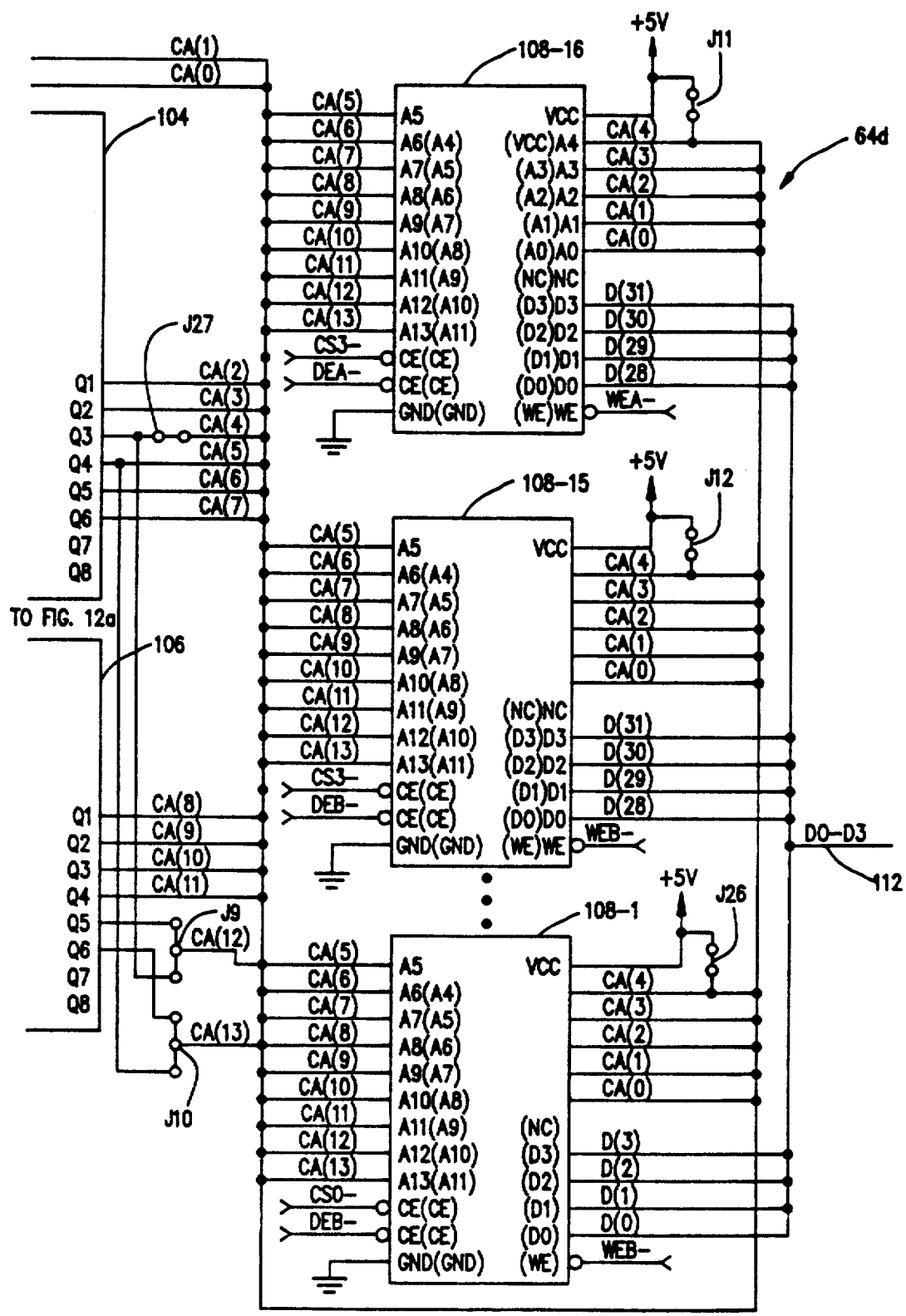

Referring next to FIG. 12, a second, preferred embodiment of a selectable 32 or 128 Kbyte cache memory configuration constructed in accordance with the teachings of the present invention may now be seen. Similar to the 32 Kbyte cache subsystem illustrated in FIG. 5 and the 128 Kbyte cache subsystem illustrated in FIG. 7 the 32/128 cache subsystem configuration includes a cache controller 103, in this embodiment a Model A38202 Microcache manufactured by Austek Microsystems, a pair of address latches 104 and 106 and a series of 16 SRAMs 108-1 through 108-16. Again, only those interconnections between the various components of the 32/128 Kbyte cache subsystem 64c which differ from the 128 Kbyte cache subsystem 64b and the 32 Kbyte cache subsystem 64a illustrated in FIG. 5 shall be discussed herein.

To implement the 32/128 Kbyte selectable cache subsystem 68d, with the single printed circuit board 101, 19 sets of jumper pads J9 through J27 are provided at various locations throughout the cache subsystem 64d. Preferably, each two-way jumper pad pair J-11 through J-27 consists of a pair of 25 mil×75 mil oval pads configured for receiving a surface mounted zero ohm shunt therebetween (shown in phantom in FIG. 12). Similarly, both three-way jumper pad triplets J9 and J10 consist of three 25 mil×75 mil oval pads (a top pad, a middle pad and a lower pad) configured for receiving a surface mounted zero ohm shunt (also shown in phantom in FIG. 12) between either the top and the middle pads or the middle and the bottom pads. The position of both shunts in the three-way jumper pad triplets J9 and J10 or whether the corresponding shunt is installed between the jumper pad pairs J-11 through J-27 will determine the size of the cache subsystem 64d upon assembly. Contrasting the cache subsystem 64c illustrated in FIG. 9 with the cache subsystem 64d illustrated in FIG. 12, the selectable 32/128 Kbyte cache subsystem 64d is the same except that the terminals A2-A31 of the cache controller 103 receive address bits A(2)-A(31). Similarly, the snoop terminals SNA6-SNA31 of the cache controller 103 receive snoop addresses SNA(6)-SNA(31) from the local snoop address bus 11. Snoop terminals SNA(2)-SNA(5) are not used in this preferred embodiment.

The cache subsystem 64c shown in FIG. 9 and described above utilizes a technique wherein the address and snoop address signals are jumpered and swapped to form the address bus bit fields as shown in FIG. 10 and FIG. 11. The cache subsystem 64d shown in FIG. 12 does not require that the address and snoop address signals be jumpered and swapped externally because the cache controller 103 (Austek Model 838202) does the swapping internally.

The address bus bit field for the cache subsystem 64d illustrated in FIG. 12 when the cache subsystem 64d is selected to be a 32 Kbyte cache subsystem may be seen by reference again to FIG. 10. Similar to the address bus bit field for the selected 32 Kbyte cache memory subsystem 64c, the address bus bit field for the selected 32 Kbyte cache memory subsystem 64d is comprised of the same 18 bit tag address field, 9 bit set address field and 1 bit line select address field previously described in detail with respect to the cache subsystem 64c. Similarly, when the cache subsystem 64d is selected to be a 128 Kbyte cache subsystem, the address bus bit field may be seen by reference again to FIG. 11. Again, the address bus bit field for the selected 128 Kbyte cache memory subsystem 64d is the same as the address bus bit field for the selected 128 Kbyte cache memory subsystem 64c previously described.

As can be seen from the above description of the present invention, there are provided two embodiments of a cache subsystem installed on a single printed circuit board and having a selectable cache memory size. By providing a cache subsystem operable with multiple sizes of cache memory, a single cache subsystem may be utilized in any number of different computer systems. As a result, the costs of designing, testing and producing cache subsystems are reduced. Rather than designing, testing and producing multiple cache subsystems of multiple cache sizes, a single cache subsystem may be produced and modified to provide the desired multiple cache sizes. As only one cache subsystem need be designed and tested, the time and cost of doing so is reduced. Furthermore, as one cache subsystem design may be readily modified into a number of different sized caches, more cache subsystems may be produced, thereby permitting the manufacturer to produce cache subsystems at lower costs. Finally, the cache subsystem described and illustrated herein reduces the cost of upgrading a computer system. In the past, if a larger cache subsystem was required during a computer upgrade, the entire cache subsystem would need to be replaced. To expand the selectable cache subsystem, however, requires only the installation of a series of jumper connections and the replacement of the static RAM chips which make up the cache memory. Thus, field upgrades of existing equipment are greatly simplified.

However, those skilled in the art will recognize that many modifications and variations besides those specifically mentioned may be made in the techniques described herein without departing substantially form the concept of the present invention. Accordingly, it should be clearly understood that the form of the invention described herein is exemplary only and is not intended as a limitation on the scope of the invention.

What is claimed is:

1. A computer system which includes a processor subsystem, a memory subsystem, and a cache subsystem, said cache subsystem comprising:

a cache memory of specified dimensions coupled within said cache subsystem via slots, said slots capable of receiving an alternative cache memory of different specified dimensions;

cache memory control means for receiving an address bus bit field corresponding to a requested address from said processor subsystem and transmitting control signals to said cache memory based on said received address bus bit field, said address bus bit field providing an address within said cache memory corresponding to said address requested by said processor subsystem;

means for modifying said address bus bit field based on said dimensions of said cache memory; and means for addressing said cache memory via said modified address bus bit field;

wherein said address bus bit field is comprised of a tag address field, a set address field and a line select field, and wherein said means for modifying said address bus bit field based on said dimensions of said cache memory further comprises means for modifying said line select address field, said tag address field and said set address field; and wherein said means for means for modifying said address bus bit field based on said dimensions of said cache memory further comprises means for providing a duplicate of a portion of said set address field within said tag field.

2. The computer system as set forth in claim 1 wherein said cache memory control means for transmitting control signals to said cache memory further comprises:

a cache controller for receiving inputs corresponding to said tag address field, said set address field and said line select address field from said processor subsystem, said cache controller generating address signals to said cache memory indicative of the tag address of said tag address field.

3. A computer system as set forth in claim 2 further comprising:

address latching means for receiving inputs corresponding to said set address location field and said line select address field from said processor subsystem, said address latching means generating address signals to said cache memory indicative of the set address and line select address of said requested address.

4. A computer system as set forth in claim 3 wherein said cache controller generates at least one control signal for enabling said address latching means.

5. A computer system as set forth in claim 4 wherein said cache controller generates at least one control signal enabling said cache memory to transmit data to said processor subsystem.

6. A computer system as set forth in claim 3 wherein said cache memory comprises sixteen 4K×4 static Random Access Memories (RAM) and said address bus bit field further comprises an eighteen bit tag address field, a nine bit set address location field and a one bit line select address field.

7. A computer system as set forth in claim 3 wherein said cache memory comprises sixteen 16K×4 static RAMs and said address bus bit field further comprises an eighteen bit tag address field, a nine bit set address location field and a three bit line select address field.

8. A computer system as set forth in claim 7 wherein said cache memory eighteen bit tag address field further comprise sixteen tag address bits and two set address bits for double checking said set address.

9. A computer system as set forth in claim 8 wherein said address latching means is comprised of a pair of address latches, said cache memory is comprised of a series of static RAM chips and wherein said cache subsystem further comprises:

a printed circuit board having a first group of sockets for mounting said cache controller, a second group of sockets for mounting said address latches and a third group of sockets for mounting said series of static RAM chips.

10. A computer system as set forth in claim 9 further comprising:

a series of jumper connectors, one for each of said series of static RAM chips;

said third group of sockets is further comprised of 24 pin receiving sockets for each one of said series of static RAM chips; and said cache memory is comprised of sixteen 22 pin 4K×4 static RAMs, each of said pins configured to be received in one of said sockets, each of said jumper connectors permitting an associated 22 pin static RAM to operate in a 24 pin receiving socket.

11. A computer system as set forth in claim 3 wherein said cache memory is comprised of a series of static RAM chips, each of said static RAM chips having a series of inputs identically connected to said address latching means and wherein said cache subsystem further comprises:

a first three way jumper for alternately connecting a first one of said inputs of each of said series of static RAM chips to either a first output of said address latching means transmitting a first one of said address signals generated by said address latching means or a second output of said address latching means transmitting a second one of said address signals generated by said address latching means; and a second three way jumper for alternately connecting a second one of said inputs of each of said series of static RAM chips to either a third output of said address latching means transmitting a third one of said address signals generated by said address latching means or a fourth output of said address latching means transmitting a fourth one of said address signals generated by said address latching means.

12. A computer system as set forth in claim 3 further comprising:

means for generating a snoop address bus bit field; and means for modifying said snoop address bus bit field based on said dimensions of said cache memory.

13. A computer system as set forth in claim 3 wherein said cache controller further comprises:

a first series of address terminals, each of said first series of address terminals connected to one of said tag address field inputs;

a second series of address terminals;

a third series of address terminals;

a first three-way jumper connector for alternately connecting a first one of said third series of address terminals to a first one of said line address field inputs or to ground;

a second three-way jumper connector for alternately connecting a second one of said third series of address terminals to a second one of said line address field inputs or to ground; and each remaining one of said third series of address terminals being connected to one of said line address field inputs.

14. A computer system as set forth in claim 13, further comprising:
    a third three-way jumper connector for alternately connecting a first one of said second series of address terminals to a first one of said set address field inputs or to a second one of said set address field inputs;
    a fourth three-way jumper connector for alternately connecting a second one of said second series of address terminals to a third one of said set location field inputs or to a fourth one of said set address field inputs; and
    wherein each remaining one of said second series of address terminals is connected to one of said set address field inputs.

15. A computer system as set forth in claim 14 wherein when said first one of said second series of address terminals is connected to said second one of said set location field inputs and said second one of said second series of address terminals is connected to said fourth one of said set address field inputs, two of said first series of address terminals are connected to two of said set address field inputs.

16. A computer system as set forth in claim 14 wherein said cache memory is comprised of a series of static RAM chips, each of said static RAM chips having a series of inputs identically connected to said address latching means and wherein said cache subsystem further comprises:
    a fifth three way jumper for alternately connecting a first one of said inputs of each of said series of static RAM chips to either a first output of said address latching means transmitting a first one of said address signals generated by said address latching means or a second output of said address latching means transmitting a second one of said address signals generated by said address latching means; and
    a sixth three way jumper for alternately connecting a second one of said inputs of each of said series of static RAM chips to either a third output of said address latching means transmitting a third one of said address signals generated by said address latching means or a fourth output of said address latching means transmitting a fourth one of said address signals generated by said address latching means.

17. A cache subsystem having a selectable cache memory, comprising:
    a printed circuit board;
    means for installing a selectable one of a first removable cache memory of a first size and a second removable cache memory of a second size on said printed circuit board;
    a cache controller installed on said printed circuit board for receiving a series of signals corresponding to an address within said cache memory installed on said printed circuit board and generating control signals to said cache memory installed on said printed circuit board based upon said series of received address signals;
    means for modifying said series of address signals based on said size of said cache memory installed on said printed circuit board; and
    means for addressing said installed cache memory via said modified address bus bit field;
    wherein either said first removable cache memory or said second removable cache memory is installed on said printed circuit board and said address signal modifying means adjusts the number and order of said series of address signals transmitted to said cache controller based upon the size of said installed cache memory;
    wherein said first removable cache memory is comprised of a plurality of 4K×4 static RAM chips and said second removable cache memory is comprised of a plurality of 16K×4 static RAM chips;
    wherein said printed circuit board further comprising a series of groups of sockets, each said group of sockets either receiving one of said static RAMs of said first cache memory or one of said static RAMs of said second cache memory; and
    wherein said static RAMs of said first cache memory have a first number of connector pins and said static RAMs of said second cache memory have a second number of connector pins different from said first number of pins; and wherein said cache subsystem further comprises jumper connector means for permitting both said static RAMs of said first cache memory and said static RAMs of said second cache memory to operate in groups of sockets which correspond to said large number of static RAM pins.

18. A cache subsystem as set forth in claim 17 wherein said series of address signals is comprised of first, second and third fields, said first field indicative of a tag address, said second field indicative of a set address and said third field indicative of a line select address and wherein said address signal modifying means generates a three bit line select address field when said second removable cache is installed and said address signal modifying means generates a one bit line select address field when said first removable cache memory is installed.

19. A cache subsystem as set forth in claim 18 wherein said address signal modifying means further comprises means for grounding two of said three address signal bits which comprise said three bit line select address field when said first removable cache memory is installed.

20. A cache subsystem as set forth in claim 17 wherein said series of address signals is comprised of first, second and third fields, said first field indicative of a tag address, said second field indicative of a set address and said third field indicative of a line select address and wherein said address signal modifying means generates a one bit line select address field, a nine bit set address field and an eighteen bit tag address field when said first cache memory is installed and wherein said address signal modifying means further comprises means for switching two of said set address bits into said line select address field and duplicating two of said tag address bits in said set address field when said first cache memory is removed and said second cache memory is installed.

21. A cache subsystem as set forth in claim 20 wherein said cache controller also receives a second series of signals corresponding to a snoop address and wherein said cache subsystem further comprises means for modifying said series of snoop address signals based on said size of said cache memory installed on said printed circuit board.

22. A cache subsystem as set forth in claim 21 wherein said series of snoop address signals is comprised of first, second and third fields, said first field indicative of a snoop tag address, said second field indicative of a snoop set address and said third field indicative of a snoop line select address and wherein said snoop address signal modifying means generates a one bit snoop line select address field, a nine bit snoop address set address field and an eighteen bit snoop tag address field when said first cache memory is installed and wherein said snoop address signal modifying means further comprises means for switching two of said snoop set address bits into said snoop line select address field and duplicating two of said snoop tag address bits in said snoop set address field when said first cache memory is removed and said second cache memory is installed.

23. A cache subsystem as set forth in claim 20 further comprising:
   address latching means for receiving inputs corresponding to said set address field and said line select address field and transmitting address latch signals to said installed cache memory, each of said static RAM chips comprising said installed cache memory having a series of inputs connected to said address latching means;
   means for connecting a first one of said inputs of each of said series of static RAM chips to either a first output of said address latching means transmitting a first one or a second output of said address latching means transmitting a second one of said address signals generated by said address latching means; and
   means for connecting a second one of said inputs of each of said series of static RAM chips to either a third output of said address latching means transmitting a third one or a fourth output of said address latching means transmitting a fourth one of said address signals generated by said address latching means; wherein said first static RAM inputs are connected to said first output and said second static RAM inputs are connected to said third output when said first cache memory is installed and said first static RAM inputs are connected to said second output and said second static RAM inputs are connected to said fourth output when said second cache memory is installed.

24. A cache subsystem having a selectable 32 Kbyte or 128 Kbyte cache memory, comprising:
   a printed circuit board;
   a 32 Kbyte cache memory;
   a 128 Kbyte cache memory;
   means for selectively installing said 32 Kbyte cache memory or said 128 Kbyte cache memory on said printed circuit board;
   a cache controller installed on said printed circuit board and configured for receiving a 31 bit address signal corresponding to an address within said installed cache memory and generating control signals to said installed cache memory based upon said received address signal; and
   means for generating said 31 bit address signal as an eighteen bit tag address, nine bit set address, and one bit line select address signal when said 32 Kbyte cache memory is installed and generating said 31 bit address signal as an eighteen bit tag address, nine bit set address, and three bit line select address signal when said 128 Kbyte cache memory is installed.

25. A cache subsystem as set forth in claim 24 wherein said means for generating said 24 bit address signal when said 128 Kbyte cache memory is installed produces an address signal having an eighteen bit tag address field filled with sixteen tag address bits and two set address bits, a nine bit set address field filled with nine set bits, two of which duplicate said two set bits in said tag address field and a three bit line select address filled with three line select address bits.

26. A cache subsystem as set forth in claim 25 further comprising means for generating a 31 bit snoop address signal as an eighteen bit tag address, nine bit set address, and one bit line select address signal when said 32 Kbyte cache memory is installed and generating said 31 bit snoop address signal as an eighteen bit tag address, nine bit set address, and three bit line select address signal when said 128 Kbyte cache memory is installed.

27. A cache subsystem as set forth in claim 26 wherein said means for generating said 31 bit snoop address signal when said 128 Kbyte cache memory is installed produces a snoop address signal having an eighteen bit tag address field filled with sixteen tag address bits and two set address bits, a nine bit set address field filled with nine set location bits, two of which duplicate said two set address bits in said tag address field and a three bit line select address field filled with three line select bits.

* * * * *